(12) United States Patent
Divigalpitiya et al.

(10) Patent No.: US 11,039,579 B2
(45) Date of Patent: Jun. 22, 2021

(54) ELECTRICALLY SWITCHABLE SHUTTER

(71) Applicant: 3M INNOVATIVE PROPERTIES COMPANY, St. Paul, MN (US)

(72) Inventors: Ranjith Divigalpitiya, London (CA); Lorne A. Whitehead, Vancouver (CA)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 131 days.

(21) Appl. No.: 16/193,372

(22) Filed: Nov. 16, 2018

(65) Prior Publication Data

US 2019/0174683 A1 Jun. 13, 2019

Related U.S. Application Data

(60) Provisional application No. 62/597,514, filed on Dec. 12, 2017.

(51) Int. Cl.

| A01G 9/14 | (2006.01) |
| E04B 1/80 | (2006.01) |
| E06B 9/264 | (2006.01) |
| F28F 13/16 | (2006.01) |
| F28F 13/00 | (2006.01) |

(Continued)

(52) U.S. Cl.
CPC ............ *A01G 9/1415* (2013.01); *E04B 1/806* (2013.01); *E06B 9/262* (2013.01); *E06B 9/264* (2013.01); *F28F 13/003* (2013.01); *F28F 13/16* (2013.01); *E06B 2009/2464* (2013.01); *E06B 2009/2627* (2013.01); *E06B 2009/2643* (2013.01)

(58) Field of Classification Search
CPC ....... A01G 9/1415; E06B 9/262; E06B 9/264; E06B 2009/2643; E06B 2009/2627; E06B 2009/2464; E04B 1/806; F28F 13/16; F28F 13/003

USPC ........................................................ 310/300
See application file for complete search history.

(56) References Cited

U.S. PATENT DOCUMENTS

| 2,532,011 A | 11/1950 | Dahlquist |
| 3,594,989 A | 7/1971 | Bastiaans |

(Continued)

FOREIGN PATENT DOCUMENTS

| WO | WO 2015-126709 | 8/2015 |
| WO | WO 2017-041184 | 3/2017 |
| WO | WO 2017041184 | * 3/2017 |

OTHER PUBLICATIONS

A flexible and transparent Graphene-Based Triboelectric nano-generator (Year: 2016).*

*Primary Examiner* — Ahmed Elnakib
(74) *Attorney, Agent, or Firm* — Eric E. Silverman

(57) ABSTRACT

A device includes a connected array of cells formed in a stack of flexible sheets. Each pair of adjacent sheets in the stack includes a first sheet and a second sheet bonded together at multiple bond locations. Each sheet has an electrically conductive layer disposed on an electrically non-conductive layer, the conductive layer comprising an electrically conductive non-metal material. Each pair of adjacent sheets in the stack is arranged so that the non-conductive layer of each first sheet is between the conductive layers of the first and second sheets. The cells of the array reversibly transition between an open state and a closed state in response to an electric potential having a magnitude greater than a threshold value applied between the conductive layers of the first and second sheets.

17 Claims, 19 Drawing Sheets

(51) Int. Cl.
*E06B 9/262* (2006.01)
*E06B 9/24* (2006.01)

(56) References Cited

U.S. PATENT DOCUMENTS

| | | | |
|---|---|---|---|
| 3,897,997 | A | 8/1975 | Kalt |
| 3,989,357 | A | 11/1976 | Kalt |
| 4,249,919 | A * | 2/1981 | Kalt ............ B03C 3/60 96/99 |
| 4,266,339 | A | 5/1981 | Kalt |
| 4,468,663 | A | 8/1984 | Kalt |
| 4,488,784 | A | 12/1984 | Kalt |
| 4,695,837 | A | 9/1987 | Kalt |
| 5,064,722 | A | 11/1991 | Swofford |
| 5,290,615 | A | 3/1994 | Tushaus |
| 5,519,565 | A | 5/1996 | Kalt |
| 5,753,346 | A | 5/1998 | Leir |
| 5,850,861 | A | 12/1998 | Silverberg |
| 6,057,814 | A | 5/2000 | Kalt |
| 6,180,245 | B1 | 1/2001 | Janssen |
| 6,184,608 | B1 | 2/2001 | Cabuz |
| 6,204,350 | B1 | 3/2001 | Liu |
| 6,511,701 | B1 | 1/2003 | Divigalpitiya |
| 6,646,364 | B1 * | 11/2003 | Horning ............ B81B 3/0021 310/309 |
| 6,664,359 | B1 | 12/2003 | Kangas |
| 6,684,469 | B2 | 2/2004 | Horning |
| 6,759,769 | B2 | 7/2004 | Kirgavainen |
| 6,824,820 | B1 | 11/2004 | Kinning |
| 7,229,687 | B2 | 6/2007 | Kinning |
| 7,411,020 | B2 | 8/2008 | Carlson |
| 7,645,977 | B2 | 1/2010 | Schlam |
| 7,705,826 | B2 | 4/2010 | Kalt |
| 8,024,891 | B2 | 9/2011 | Maria Ruiter |
| 8,035,075 | B2 | 10/2011 | Schlam |
| 8,134,112 | B2 | 3/2012 | Schlam |
| 8,736,938 | B1 | 5/2014 | Schlam |
| 8,764,320 | B2 | 7/2014 | Hong |
| 9,174,237 | B2 | 11/2015 | Sherman |
| 9,250,368 | B2 | 2/2016 | Padiyath |
| 9,418,938 | B2 | 8/2016 | Kitamura |
| 2002/0144831 | A1 | 10/2002 | Kalt |
| 2015/0333424 | A1 | 11/2015 | Elsernd |
| 2017/0051185 | A1 | 2/2017 | Ling |
| 2017/0198170 | A1 | 7/2017 | Clapper |
| 2018/0274289 | A1 * | 9/2018 | Whitehead ............ A01G 9/225 |
| 2019/0174683 | A1 * | 6/2019 | Divigalpitiya .......... E06B 9/262 |

* cited by examiner

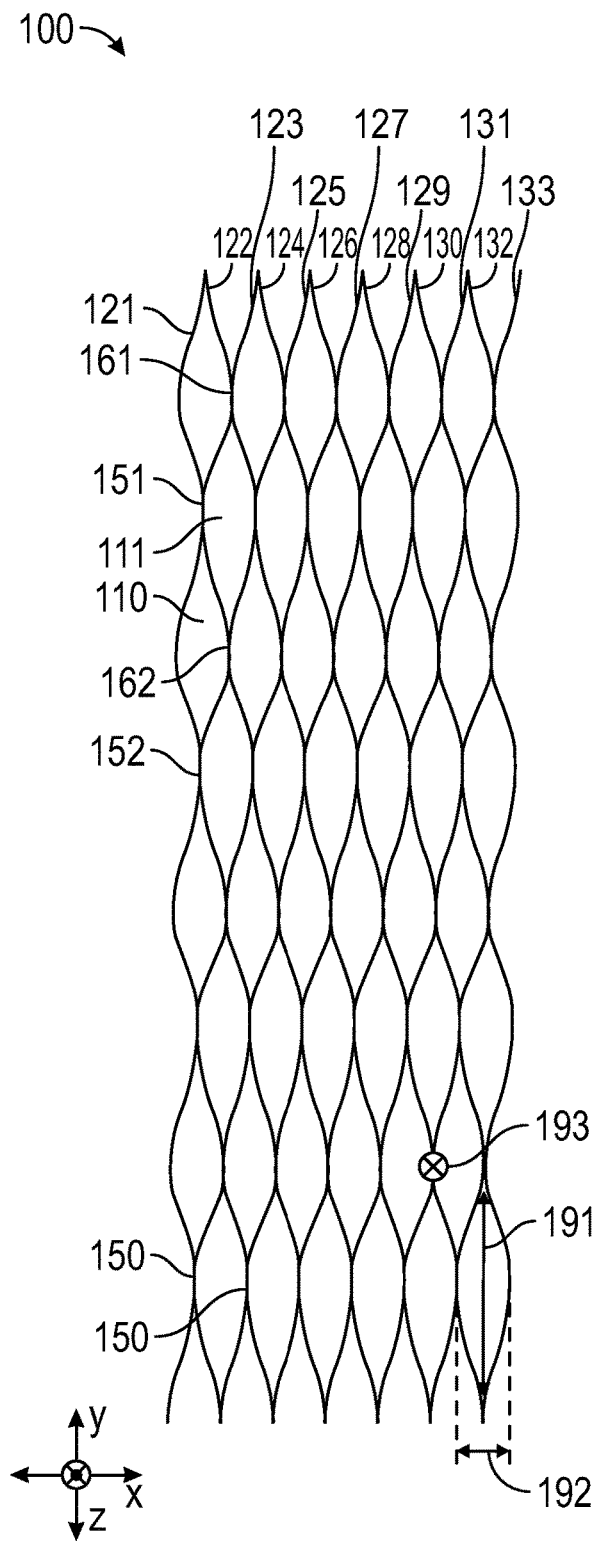
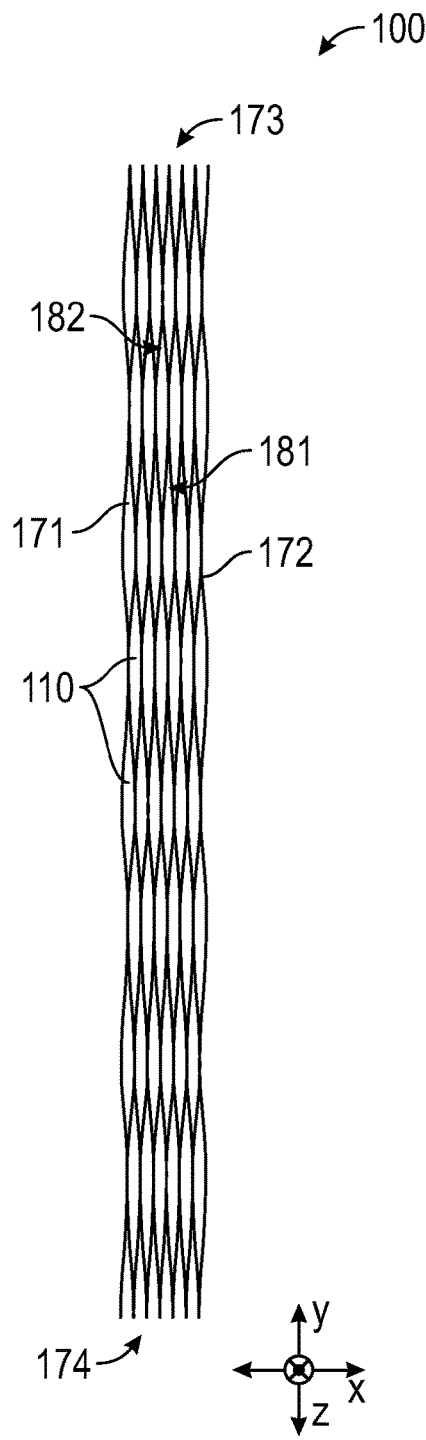
FIG. 1A  FIG. 1B

100 ↘

110

↙ 100

110

Direction of Expansion/
Compression

ELECTRICALLY SWITCHABLE SHUTTER

TECHNICAL FIELD

This disclosure relates to electrically switchable shutters and to methods and systems related to electrically switchable shutters.

BACKGROUND

Shutters are useful to control the transmission of light and/or heat through windows and/or other building components. A variable thermal insulation assembly including an array of air-enclosing cavities or pockets that are adjustable between an expanded state and a compressed state has been described in WO2017/041184.

BRIEF SUMMARY

Some embodiments are directed to a device comprising a connected array of cells comprising a stack of flexible sheets. Each pair of adjacent sheets in the stack includes a first sheet and a second sheet bonded together at multiple bond locations. Each sheet has an electrically conductive layer disposed on an electrically non-conductive layer. The conductive layer comprises an electrically conductive non-metal material. Each pair of adjacent sheets in the stack is arranged so that the non-conductive layer of each first sheet is between the conductive layers of the first and second sheets. The cells of the array are configured to reversibly transition between an open state and a closed state in response to an electric potential having a magnitude greater than a threshold value applied between the conductive layers of the first and second sheets.

These and other aspects of the present application will be apparent from the description below. In no event, however, should the above summaries be construed as limitations on the claimed subject matter, which subject matter is defined solely by the attached claims.

BRIEF DESCRIPTION OF THE DRAWINGS

FIGS. 1A and 1B respectively illustrate an array of connected cells that is expanded and compressed when viewed along the z axis in accordance with some embodiments;

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Embodiments disclosed herein are directed to electrically controlled shutters that can be operated as variable light transmission assemblies and/or as variable thermal insulation assemblies. Controllable shutters as disclosed herein are useful for installation in greenhouses to provide optimal transmission of light in conjunction with controllable thermal insulation. Electrically controllable shutters as disclosed herein are also useful for installation in or on windows or walls to increase the energy efficiency of dwellings and other buildings.

The shutters disclosed herein are electrostatically controlled using non-metal electrically conducting layers that are flexible, lightweight, abrasion resistant, scratch resistant, and relatively insensitive to exposure to the environment, unlike for example, thin metal-coated layers.

The electrically controlled shutters according to the various embodiments discussed in more detail below can be switched from an expanded state to a compressed state in response to application of an electric potential. When expanded, the shutter may provide for increased light blocking and/or increased thermal insulation. When compressed, the shutter may provide for reduced light blocking and/or decreased thermal insulation.

In embodiments disclosed herein, an electrically controlled shutter includes an array of connected cells that can be switched from the open state to the closed state and to various states of "openness" between the fully open and fully closed states by application of an electric potential. Switching the cells to the open state causes the array to expand and switching the cells to the closed state causes the array to compress. The length of the shutter can be varied to any length between the fully expanded and fully compressed states by varying the electric potential applied to the cells.

Figure 1C:
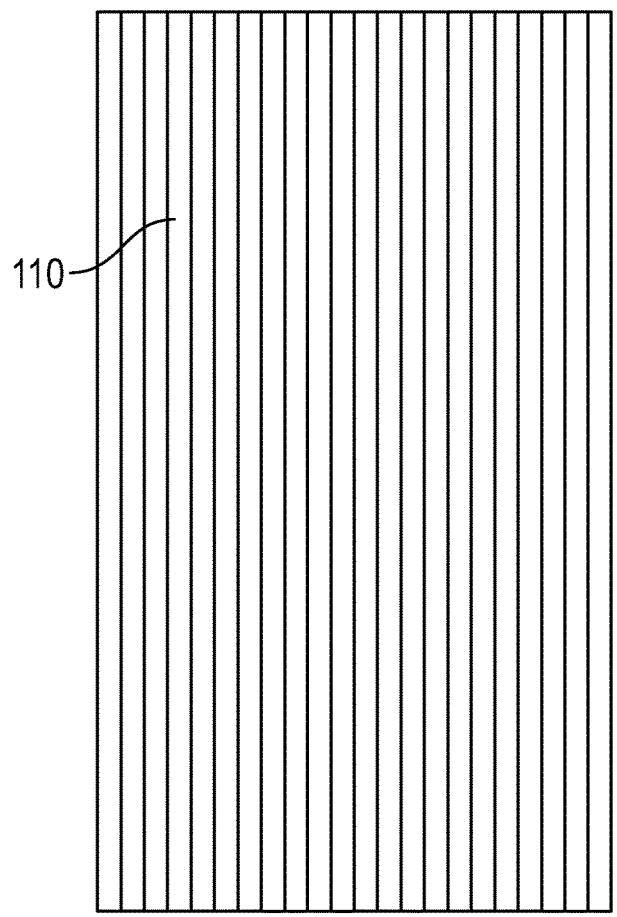
FIG. 1C illustrates the expanded array of FIG. 1A when viewed along the y axis.
Figure 1C:
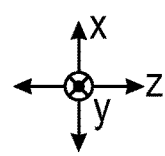
Figure 1D:
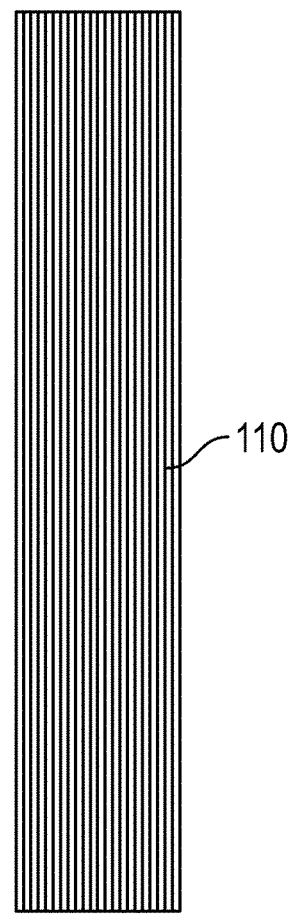
FIG. 1D illustrates the compressed array of FIG. 1B when viewed along the y axis.
Figure 1D:
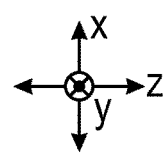

FIGS. 1A and 1B respectively illustrate an array 100 that is expanded and compressed when viewed along the z axis as indicated in FIGS. 1A and 1B. FIG. 1C illustrates the expanded array 100 when viewed along the y axis. FIG. 1D illustrates the compressed array 100 when viewed along the y axis.

The cell array 100 is formed by a stack of sheets 121-133, which are sufficiently flexible to move as described herein. Each pair of adjacent sheets in the stack is bonded together at multiple bond locations 150. The individual cells 110 are disposed between adjacent bond locations 150 and between facing surfaces of the first and second sheets in the pair of sheets. For example, adjacent sheets 121 and 122, which are adjacent to each other, are bonded at bond locations 151, 152 and cell 110 is disposed between facing surfaces of the sheets 121 and 122 and between bond locations 151, 152. As another example, adjacent sheets 122 and 123 are bonded at bond locations 161, 162 and cell 111 is disposed between facing surfaces of the sheets 122 and 123 and between bond locations 161, 162. In various embodiments, the distance between each pair of bonds 150 can be greater than about 10 mm and less than about 50 mm.

Each sheet 121-133 has an electrically conductive layer disposed on an electrically insulative (non-conductive) layer, e.g., having a volume resistivity greater than about $10^{10}$ Ω-m. The electrically non-conductive layer has a first surface and a second surface, wherein an electrically conductive layer is disposed only on the first surface and not on the second surface of the electrically non-conductive layer. Each pair of adjacent first and second sheets in the stack is arranged so that the non-conductive layer of each first sheet is between the conductive layers of the first and second sheets. The cells are configured to reversibly transition between states of openness in response to an electrical potential applied between the conductive layers of the first and second sheets. For example, each cell may transition from a fully open state to a fully closed state in response to an electric potential above a threshold applied between the conductive layers of the first and second sheets.

In the open state, each cell 110 is a three dimensional structure having a lateral axis 191 that lies along the y axis in FIG. 1A, a height axis 192 that lies along the x axis in FIG. 1A, and a longitudinal axis 193 which runs into the page in along the x axis in FIG. 1A. The height of the cell 110 along the height axis is maximum when the cell 110 is in the fully open state and is minimum, e.g., zero, when the cell 110 is in the fully closed state. As shown in FIG. 1B, the cell array 100 has a first edge 171 and an opposing second edge 172, the first and second edges 171, 172 running substantially parallel to the height axis 192 of the cells 110. The cell array 100 has a third edge 173 and an opposing fourth edge 174, the third and fourth edges 173, 174 running substantially parallel to the lateral axes 191 of the cells 110.

Sheets 121, 133 that run along the first and second edges are referred to as surface sheets. Sheets 121 and 133, which are located on the surface, may comprise the same materials and/or may be formed in the same manner as the sheets 122-132, which are located on the interior; alternatively sheets 121, 133 may be or comprise different materials and/or may be formed in a different manner as sheets 122-132. For example, the surface sheets may be thicker and/or may be less flexible.

Each bond 150 joins together a pair of adjacent sheets from among sheets 121-133 at discrete locations along the length of the sheet and extends along the longitudinal axis of the cells 110. As such, each pair of the sheets 121-133 defines at least one cell 110 between the pair of adjacent sheets 121-133. The at least one cell is bounded by the pair of adjacent sheets and a pair of adjacent bond regions. The cell may be symmetrical with respect to the longitudinal axis 193 of the cell 110. The bonding utilized to form bonding regions 150 may be provided by any suitable means including adhesive that is deposited as a liquid and subsequently cured, adhesive strips or films, ultrasonic bonding, thermal bonding, and chemical bonding such as solvent welding.

In the example shown in FIGS. 1A and 1B, the surface sheets 121, 133 are bonded to the adjacent sheets 122, 132 along longitudinally extending bonding regions 150 in a similar manner as sheets 122-132 are bonded to one another. Alternatively, other methods of bonding the surface sheets 121 and 133 may be utilized such as, for example, bonding the surface sheets 121 and 133 in a bonding region that extends over a majority of the outer surface area of the surface sheets 121 and 133, or over substantially all of the outer surface area of the surface sheets 121, 133, or in bonding regions that do not extend longitudinally by a substantial distance. The bond between adjacent cells 110 may or may not provide a hermetic seal between cells 110.

The array 100 has a front surface 181 and a back surface 182, where the terms "front" and "back" are used for identification only and do not imply any particular orientation of the array and do not imply an arrangement of the array with respect to any other structure. In the configuration depicted in FIGS. 1A and 1B, the array is oriented such that cells terminate at the front and back surfaces 181, 182. FIG. 1A shows the open ends of the cells 110 at the front and back surfaces 181, 182 of the array 100. In some embodiments, the ends of the cells 110 may be covered by a flexible or rigid element, however, the cells allow for air of other gas to enter or exit the cells as the cells open and close. The dimension of each cell 110 along the lateral axis 191 i.e., the spacing between bonding regions 150, may be less than about 5 cm, or may be less than about 1 cm. The cells can have any length along the longitudinal axis 193, ranging from less than 2 cm to several meters or more.

An electric potential of above a threshold value applied between the electrically conductive layers of pairs of the adjacent sheets 121-133 causes the cells 110 to transition from the open state to the closed state and the array 100 compresses, shown in FIGS. 1B and 1D. When the electric potential is removed, the cells 110 transition from the closed state to the open state and the distance between surface sheets 121, 133 increases and the array expands as shown in FIGS. 1A and 1C. When compressed, the length of the array 100 is significantly less than when the array is expanded. In many applications, the length of the array 100 when the array is fully compressed is about 25% or less, or even less than 5%, of the length of the array 100 when the array is fully expanded.

Air (or other gas) flows into the cells 110, which are in most cases thermal cells, when the array 100 is expanded and is forced out of the cells 110 when the array 100 is compressed. In the expanded state, the array 100 may act as a thermal insulator due to the gas-enclosing capabilities of cells 110. When the array 100 is used as a variable thermal insulation assembly an insignificant amount of thermally-induced convective flow occurs within each thermal cell 110. In some embodiments, the heat loss from thermal convection and from thermal conduction of the sheets may be less than 25% of the intrinsic heat loss associated with thermal conduction of the gas present in the thermal cells.

Figures 2A, 2B:
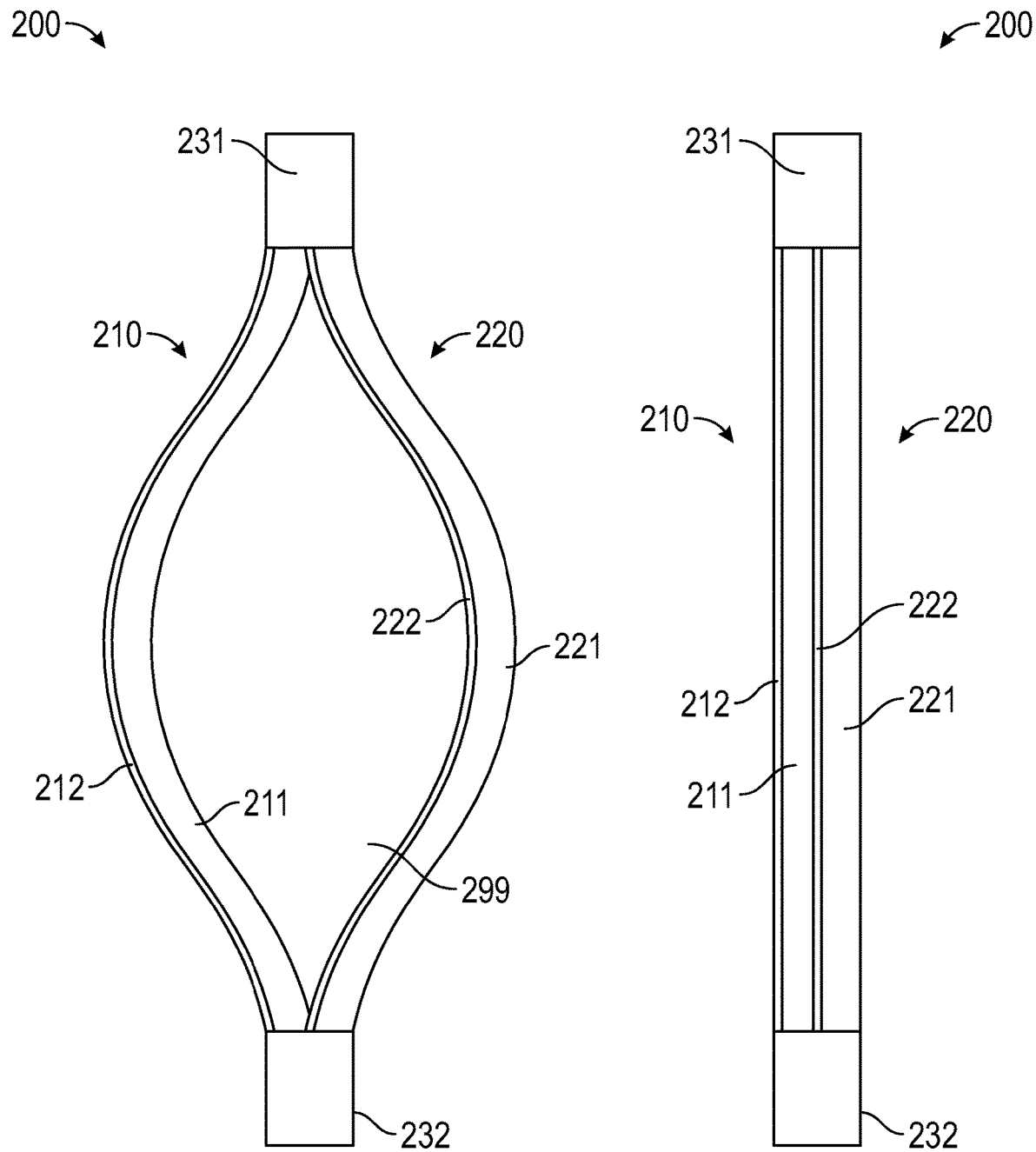
FIGS. 2A and 2B are side views that respectively show a cross-sectional view of a single cell of a cell array in the open state and a closed state in accordance with some embodiments.

FIGS. 2A and 2B respectively show a cross-sectional view of a single cell 200 of a cell array in the open state and a closed state. The cell 200 comprises a portion of adjacent first and second sheets 210, 220, which are sufficiently flexible so as to be able to operate and move as described herein, between adjacent bonds 231, 232 where the first sheet 210 is bonded to the second sheet 220. A volume 299 of the cell 200 is bounded by facing surfaces of the first 210 and second 220 sheets and by adjacent bonds 231 and 232. In the fully open state, as shown in FIG. 2A, the volume 299 of the cell 200 is maximum. In the closed state, the volume 299 of the cell 200 is substantially zero, as shown in FIG. 2B.

Each sheet 210, 220 includes an electrically non-conductive layer 211, 221 and an electrically conductive layer 212, 222 disposed on the non-conductive layer 211, 221. The electrically conductive layer 212, 222 is a thin, flexible layer that comprises a non-metal electrically conductive material. In some implementations, the non-metal electrically conductive material is a carbon-based material, such as graphene like carbon (GLC), graphite, carbon nano-tubes, ink formulations containing carbon materials, or carbon-black as discussed in more detail below. In many implementations, the non-metal conductive material may comprise nano particles. The thermal emissivity of the non-metal material can be less than about 0.2 or less than about 0.05, for example.

The non-conductive layers 211, 221 may be layers of a thin, flexible film such as a polymeric film, e.g., polyester film or Mylar, or any highly electrically non-conductive, thin, and flexible film as discussed in more detail below.

The sheets 210 and 220 may have a thickness of less than about 40 microns or even less than about 10 microns. The sheets 210, 220 are arranged such that electrically conductive layers 221, 222 are separated by a non-conductive layer 211. In this arrangement, the electrically conductive layers 212, 222 do not come into contact with each other.

In some embodiments, the cell 200 is biased in the open state. For example, at least one of the sheets 210, 220, e.g., the first sheet 210, is formed with a built-in mechanical stress that biases the first sheet 210 away from the second sheet 220. For example, in some embodiments, some or all of the sheets are subjected to a process by which the mechanical bias is imparted to the sheets, causing the sheets to have an undulating profile as shown in FIG. 1A.

The mechanical bias may be imparted to the sheets by thermoforming wherein the temperature of the sheet which is in contact with a circular tube is increased, for example. Depending on the temperature and the duration of heating, the sheet will deform to the curvature of the tube. Alternatively, the sheet may be vacuum formed where a vacuum is applied over a curved porous sheet while increasing the temperature. A GLC layer is particularly useful as the conductive layer in these types of thermoforming processes because, unlike metallic layers that fracture and/or lose conductivity, GLC layers survive the forming operation intact and without substantial changes to electrical conductivity.

One or more of the non-conductive 211, 221 and/or conductive layers 212, 222 may be formed from a material having an inherent spring-like nature that imparts the mechanical bias. One or more of the non-conductive 211, 221 and/or electrically conductive layers 212, 222 may be created by exposing layers to heat treatment or chemical treatment that imparts the mechanical stress that bias the cell into the open state as depicted in FIG. 2A.

Alternatively or additionally, the cells may not be biased in the open state and the open state may be restored by applying air or gas pressure to the previously closed cell 200, thereby inflating the cell 200. In some embodiments, the open state may be restored by using an additional spring-like element within the cell, as further discussed in connection with FIGS. 3A and 3B.

The cell 200 transitions from the open state to the closed state when of an electrical potential difference exceeding a threshold value is applied between the electrically conductive layers 212, 222 of the cell 200. The threshold electrical potential difference between the electrically conductive layers 212, 222 generates an attractive electrostatic force between the electrically conductive layers 212, 222. The magnitude of the applied electrical potential difference needed to transition the cell from the open state to the close state depends on a number of factors, including the thickness of the sheets 210, 220, the flexibility of the non-conductive and conductive layers, and the electrical conductivity of the conductive layers. For the materials and layers contemplated in this disclosure, the threshold value of the applied electric potential may be, for example, less than about 1000 V, or even less than about 500 V, or in a range of about 1 V to about 300 V. There is negligible current flow through the electrical conductive layers 212, 222 when the threshold potential difference is applied between the electrically conductive layers 212, 222 of the cell 200. The electric potential may be applied through a wire, an electrically conductive sheet, or other electrical connection (not shown) to each of the layers 212, 222, e.g., at the edge of each of the layers 212, 222.

Figure 2C:
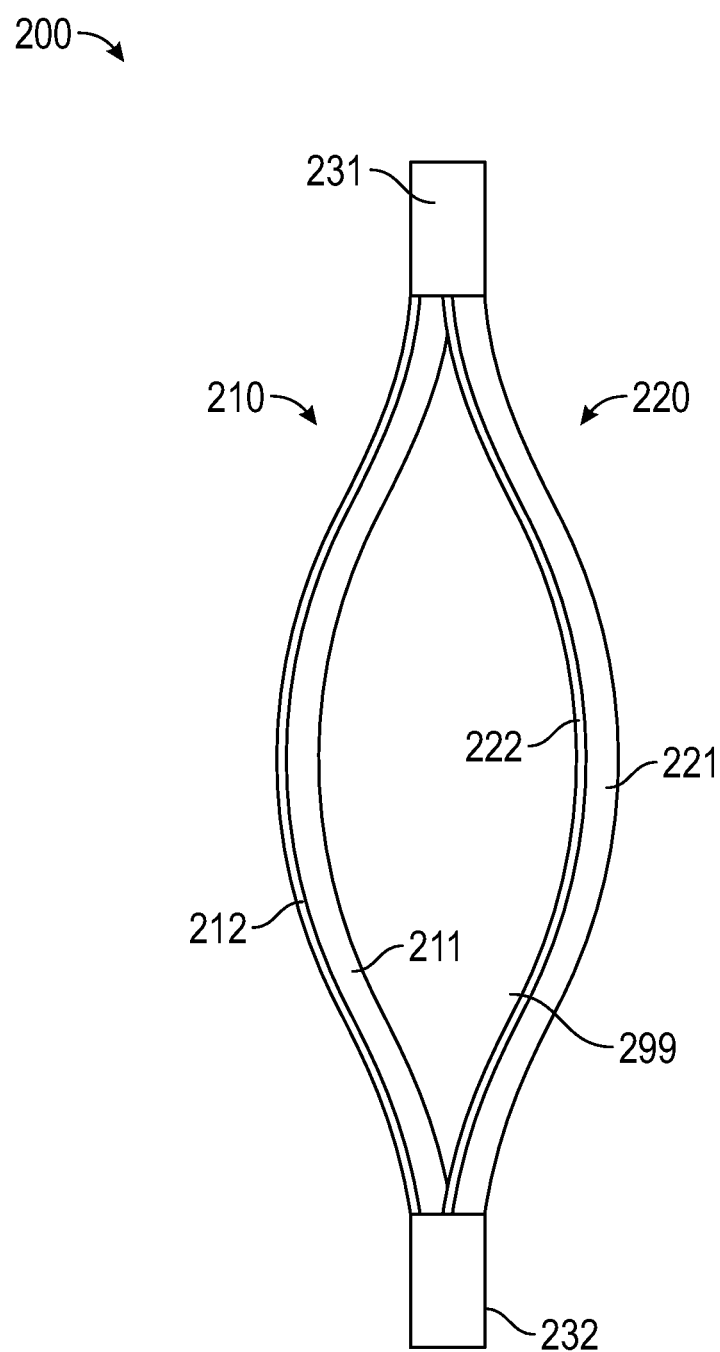
FIG. 2C is a side view that shows the cell of FIGS. 2A and 2B in a partially open state.

An applied electric potential above a threshold magnitude creates an electrostatic force that overcomes the biasing force that keeps the cell open and causes the cell to transition from the open state to the closed state as shown in FIG. 2B. After the electrical potential is removed or decreased in magnitude the cell is restored to its open state which is shown in FIG. 2A. According to some embodiments, the cell 200 may be maintained in a partially open state by applying an intermediate electric potential having a magnitude that is less than the magnitude needed to transition the cell 200 in the fully closed state. FIG. 2C shows the cell 200 in a partially open state.

Figure 3A:
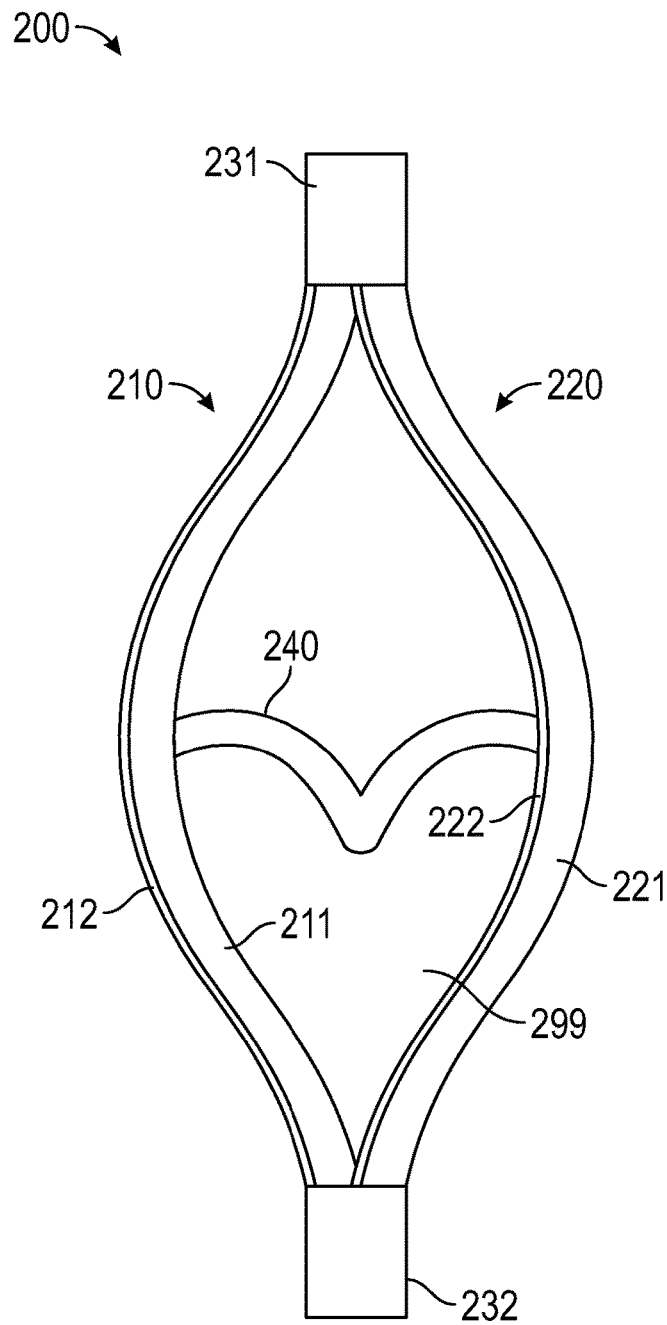
FIGS. 3A and 3B are side views that show a cell that includes a biasing element according to some embodiments.
Figure 3B:
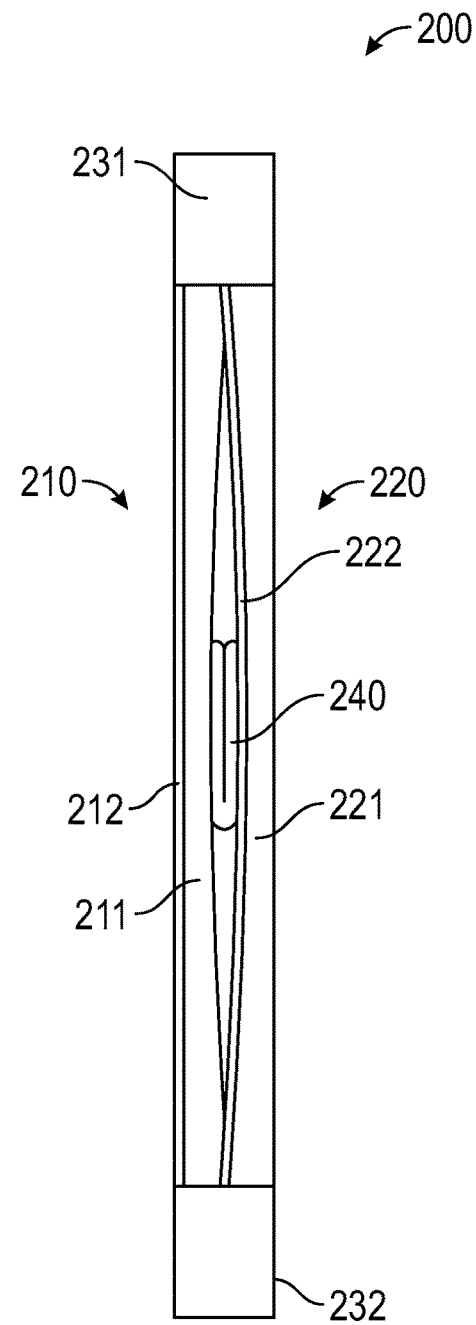

FIGS. 3A and 3B show the cell 200 of FIGS. 2A and 2B that includes a biasing element 240. FIG. 3A shows the cell 200 in the open state and FIG. 3B shows the cell in the close state. In the open state, the biasing element 240 applies a force to the sheets 210, 220 such that the open state is maintained. The biasing element 240 could be, for example, thin spring steel or other thin shim stock that exhibits a spring-like mechanical characteristic when moderately deformed. FIG. 3B shows the cell 200 in the closed state, which is achieved by applying an electrical potential difference between the electrically conductive layers 212, 222. The electrostatic force is sufficient to temporarily deform biasing element 240. The magnitude of the applied electrical potential difference needed to transition the cell from the open state to the closed state depends on a number of factors, including the thickness and flexibility of sheets 210 and 220 (including the flexibility of the non-conductive layers 211, 221, and the electrically conductive layers 212, 222), and the force required to compress the biasing element 240. The magnitude of the electric potential that causes the cell 200 to transition from the open state to the closed state creates an electrostatic force between the electrically conductive layers 212, 222 that is sufficient to overcome the mechanical forces maintaining the cell 200 in the open state such that the cell transitions to the closed state. The mechanical force applied by the sheets 210, 220 to the biasing element 240 when the cell 200 is in the closed state is less than the force that would permanently deform the biasing element 240 by a substantial amount. Removing the electrical potential difference or reducing the magnitude of the electrical potential difference previously applied between the electrically conductive layers 212, 222 removes or reduces the compressive force on biasing element 240, the biasing element 240 expands and restores the cell to the open state.

Figure 4A:
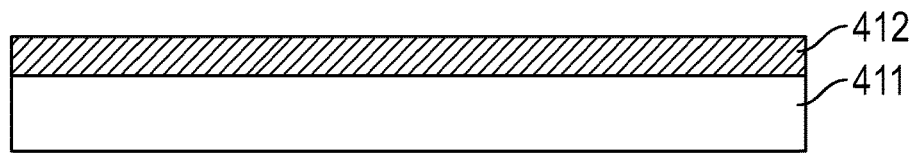
FIGS. 4A through 4C are cross sectional diagrams that show various flexible sheets that may be used to form the array of FIGS. 1A and 1B.

FIG. 4A is a cross sectional diagram of a flexible sheet 401 that may be used for the sheets 121-133 of the array 100 shown in FIG. 1A. Flexible sheet 401 has an electrically conductive layer 412 disposed over an electrically insulative (non-conductive) layer 411. The conductive layer 412 comprises an electrically conductive non-metal material. The electrically conductive layer 412 may comprise a non-metal conductive coating on the non-conductive layer 411 in some embodiments. Electrically conductive layer 412 may be a continuous layer, a non-continuous layer, a patterned layer, or a randomly applied layer.

Figure 4B:
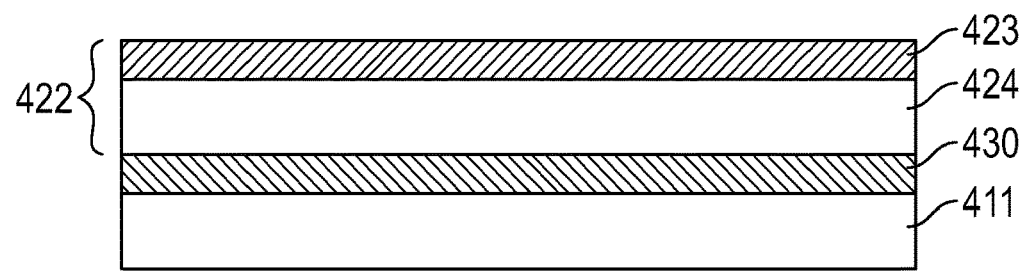

FIG. 4B is another embodiment of a flexible sheet 402. Sheet 402 includes an electrically conductive layer 422 disposed on an electrically non-conductive layer 411. The electrically conductive layer 422 in this embodiment is a multilayer structure that includes a layer 423 of a non-metal electrically conductive material disposed on an electrically non-conductive layer 424. Layer 423 may be a continuous layer, a non-continuous, a patterned layer or a randomly applied layer. Layer 424 may be made of the same material as the non-conductive layer 411 in some embodiments. In some embodiments, layer 424 may be made of a different material than layer 411. The electrically conductive layer 422 can be attached to the non-conductive layer 411 by an adhesive layer 430. The adhesive layer extends along the sheet between the discrete bond locations such that the conductive layer is adhered to the non-conductive layer.

Figure 4C:
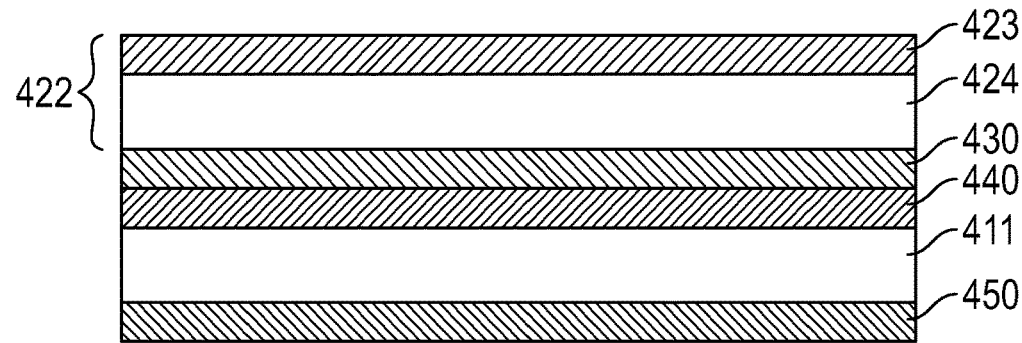

FIG. 4C is yet another example of a flexible sheet 403 that may be used for the sheets 121-133 of the cell array 100. Flexible sheet 403 is similar in many respects to sheet 402 but shows additional layers 440, 450, which are optional depending on the particular configuration and intended use of the shutter. Flexible sheet 403 differs from sheet 402 in that sheet 403 includes an optional low adhesion coating 450 disposed on the backside of the non-conductive layer 411. Flexible sheet 403 also includes an optional layer 440 as a primer disposed between the non-conductive layer 411 and the adhesive layer 430.

The sheets 401, 402, 403 described in this disclosure are sufficiently flexible to be rolled upon themselves so that the sheets 401, 402, 403 can be supplied and used in the form of a roll.

A wide range of materials are suitable for use in the electrically non-conductive layers 411, 424. For example, these layers may be polymeric layers prepared from polymeric materials, either a single polymeric material or a blend of polymeric materials. In embodiments in which optical transparency is a desired feature of the array, typically the polymeric layers are optically transparent or optically clear. Suitable polymeric layers for use as the electrically non-conductive layers are described in commonly owned U.S. Pat. Nos. 6,180,245 and 9,250,368 which are incorporated herein by reference. The electrically non-conductive layers 411, 424 may be prepared from the same materials or from different materials. In most cases, both are prepared from polymeric materials. Examples of suitable materials for layers 411, 424 include: polyesters, such as for example polyethylene terephthalate (PET), and polyester copolymers; polyolefins, such as polyethylene (PE, including a wide range of grades of polyethylene such as low density polyethylene LDPE) and polyethylene copolymers, polypropylene (PP, including biaxially oriented polypropylene BOPP), and polyolefin copolymers; polyurethanes, including polyurethane copolymers; polyacrylate polymers and copolymers; polyvinyl polymers and copolymers; polymethylmethacrylate polymers and copolymers; polycarbonate polymers and copolymers; and combinations and mixtures thereof. In some embodiments, the non-conductive layer may be a non-porous polymeric substrate, such as non-porous versions of polyester, polypropylene, polyethylene, polystryrene, polycarbonate, polyvinylchloride, polyimide, and/or polymethyl methacrylate. The non-conductive layer can be a porous layer with very small pores, or it could be a highly porous layer. For example, the non-conductive layer may have pockets extending at least partially through the thickness of the layer, with one or more skin-layers extending across the pockets to contain air, or other gas, with in pockets.

The electrically non-conductive layers 411, 424 may be of any suitable thickness. Typically, the non-conductive layers are in the range of from about 5 micrometers (0.2 mils) to about 100 micrometers (4 mils), more typically the substrates are in the range of from about 6 micrometers (0.25 mils) to about 32 micrometers (1.25 mils), or even 13 micrometers (0.5 mils) to 25 micrometers (1.0 mils).

The electrically conductive layer 423 comprises a non-metal material and may have an electrical sheet resistance of less than about $1 \times 10^8$ Ω/square and greater than about 10 Ω/square. The transition of the cell between the open and closed states does not substantially alter the sheet resistance of the electrically conductive layer.

The non-metal material may comprise a carbon containing material. Graphite, carbon black, lamp black, and/or graphene like carbon (GLC) are suitable materials for the non-metal material. Graphene like carbon is a graphitic material with a graphite or graphene platelets embedded in a nano-crystalline carbon matrix.

According to some embodiments, the non-metal material, such as GLC, comprises nano-scale exfoliatable carbon particles, such as graphite particles. The nano-scale graphite particles can be coated on a surface of the electrically non-conductive layer 411, 424. In some embodiments, coating the nano-scale graphite particles on the electrically non-conductive layer 411, 424 may be facilitated by mechanical polishing (also referred to herein as buffing). The thickness of the conductive layer can be controlled by the buffing parameter, such as the buffing time.

An electrically conductive layer 412 made of GLC comprising nano-scale graphite particles has a number of features which facilitate its application in the shutter embodiments disclosed herein. Layers made from these materials (GLC and graphite particles) are abrasion-resistant, scratch-resistant, and electrically conductive, flexible and chemically stable against corrosion due to environmental conditions. Such a layer can be relatively insensitive to exposure to the environment, unlike for example, thin metal layers, and thus the electrically non-conductive layer 423 does not require a cover coating to protect the electrically non-conductive layer 423 from the environment.

Other suitable materials for the electrically conductive layer 412 include electrically conductive polymer layers, such as PEDOT:PSS, polyaniline, polypyrrol. Electrically conducting mixed oxides such as indium tin oxide, antimony tin oxide, or combinations thereof etc. may also be used.

Electrically conductive layer 412 can be optically transparent. Even though it contains graphite particles, when a GLC layer is very thin, it is optically transparent at wavelengths of visible light. For example, a GLC coating comprising nano-scale graphite particles may have a visible light transmission (% T) of at least 75%. In some embodiments, the % T can be 80% or higher. This characteristic is particularly useful in greenhouse applications where the shutter is deployed as a variable thermal insulator without substantially decreasing light transmission into the greenhouse.

The thickness of the layer 412 may range from about 1 nanometer to about 100 nanometers. The electrically conductive layer 412 may have a low surface energy. This low surface energy helps to prevent adhesion between the electrically conductive layer 412 and the backside of the adjacent electrically non-conductive layer. For example, in some embodiments, the layer of electrically conductive graphite nano-scale particles has a surface energy of less than about 55 milliNewtons/meter (mN/m) as measured by a water contact angle test or between about 25.0 and about 30.0 mN/m as measured by a water contact angle test.

Additional information with respect to suitable materials and processes for forming the conductive layer can be found in U.S. Patent Application Publication No. 2015/0333424 which is incorporated herein by reference. The layer of abrasion-resistant, electrically conductive nano-scale particles can be prepared by a buff coating process such as is described in U.S. Pat. No. 6,511,701 (Divigalpitiya et al.) which is incorporated herein by reference.

In an exemplary process, a mixture of dry particles are applied to the first major surface of a polymeric substrate and buffed into the surface of the substrate at a pressure of less than 30 grams per centimeter with an applicator that moves in a manner parallel to the surface of the substrate. The mixture of particles comprises graphite particles, where the graphite particles have a Mohs hardness of from about 0.5 to about 2.0 and the largest dimension of the particle is less than about 100 micrometers. Graphite particles are exfoliatable particles, meaning that the particles break up into flakes, scales, sheets or layers upon application of a shear force. Thus, during the buff coating process the graphite particles exfoliate. In some embodiments, the non-metal layer is coated with a low surface energy material such as polytetrafluoroethylene (PTFE) to reduce stiction between the sheets. The low surface energy coating may be a fluoropolymer with low surface energy having a thickness less than about 5 nm or other thickness that does not significantly affect electrical conductivity of the electrically conductive layer. A low surface energy coating does not significantly alter the optical or electrical properties of the electrically conductive layer.

The mixture of particles may also include at least one type of buffing aid particle. Buffing aid particles have a low affinity for the substrate and also have a low affinity for the graphite particles. A particle is considered to have a low affinity for a substrate if the particles will not stay on the substrate by itself if buffed on the substrate using the methods of the present disclosure. Such buffing aid particles tend to separate from the exfoliatable particles during the buffing process, and help the distribution and uniformity of the exfoliatable particles on the substrate. Few or no buffing aid particles remain on the final coated product. Examples of such buffing aid particles include RADIANT MP series of encapsulated dye particles from Radiant Color Co. (Richmond, Calif.), such as magenta, MP orange, MP chartreuse, and clear particles. Other buffing aid particles include Methyl red dye particles having a CAS number of 493-52-7, Methylene blue dye particles having a CAS number of 75-09-2, Perylene Red pigment, Rhodamine B dye having a CAS number of 81-88-9, Malachite green oxalate having a CAS number of 2437-29-8, and Azure A dye having a CAS number of 531-533.

In some exemplary processes, in coating the non-metal material on the layer 411, 423, the buffing pad is moved in the plane of the layer 411, 423 parallel to the surface of the layer 411, 423. The orbital motion of the pad is carried out with its rotational axis perpendicular to the layer 411, 423. Thus, the pad moves in a plurality of directions during the buffing application, including directions transverse to the direction of the web in the case where the web is moving past the buffing pad. The buffing applicator moves in an orbital pattern parallel to the surface of the layer 411, 424 with its rotational axis perpendicular to the plane of layer 411, 424. The buffing motion can be a simple orbital motion or a random orbital motion. The typical orbital motion used is in the range of 1,000-10,000 orbits per minute.

Applicator pads that are suitable may be any appropriate material for applying particles to a surface. For example, the applicator pad may be a woven or non-woven fabric or cellulosic material. Alternatively, the pad may be a closed cell or open cell foam material. In yet another alternative, the pad may be a brush or an array of bristles. Generally, the bristles of such a brush have a length of about 0.2-1 cm, and a diameter of about 30-100 micrometers. Bristles are generally made from nylon or polyurethane. Particularly suitable buffing applicators include foam pads, lamb's wool pads, PERFECT-IT® pads available from 3M Company (St. Paul, Minn.), and the like.

The conductive layer 412 typically adheres well after aging. In some embodiments, it may be desirable to heat the layer after the buffing operation to improve the adhesion of the layer, but typically, the GLC/graphite materials do not require heating and typically have excellent adhesion to the underlying non-conductive layer 411, 423 after one day of aging at room temperature. Optionally, if desired, the excess loose powder that does not adhere to the surface of the substrate can be removed by conventional techniques such as blowing with a stream of air or other gas or through the use of a vacuum cleaner.

A wide range of adhesives are suitable for the adhesive layer 430. Heat activated adhesives and pressure sensitive adhesives are particularly suitable for the adhesive layer 430. Heat activated adhesives are non-tacky at room temperature but become tacky and capable of bonding to a substrate at elevated temperatures. These adhesives usually have a Tg (glass transition temperature) or melting point (Tm) above room temperature. When the temperature is elevated above the Tg or Tm, the storage modulus usually decreases and the adhesive becomes tacky.

In some implementations, the heat activated adhesive is optically transparent or optically clear. A wide variety of optically clear heat activated adhesives may be used. Examples of suitable optically clear heat activated adhesives include polyacrylate hot melt adhesives, polyvinyl butyrals, ethylene vinyl acetate, ionomers, polyolefins, or combinations thereof.

The heat activated adhesive may be a (meth)acrylate-based hot melt adhesive. The hot melt adhesives can be prepared from (meth)acrylate polymers that have a glass transition temperature (Tg) of greater than room temperature, more typically greater than about 40 degrees C., and are prepared from alkyl (meth)acrylate monomers. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic hot melt adhesives may also contain optional co-monomer components such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

In some embodiments, the adhesive layer is at least partially formed of polyvinyl butyral. The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated (St. Louis, Mo.), under the trade name BUTVAR® resin.

In some implementations, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates, citric acid, citrate salts, and citrate esters.

Examples of suitable ethylene vinyl acetate (EVA) adhesives include a wide range of commercially available EVA hot melt adhesives. Typically, these EVA hot melt adhesives have a vinyl acetate content of from about 18-29% by weight of the polymer. The adhesives typically have high amounts of tackifiers and waxes. An exemplary composition is one with 30-40% by weight of EVA polymer, 30-40% by weight of tackifier, 20-30% by weight of wax, and 0.5-1% by weight of stabilizers. Examples of suitable EVA hot melt adhesives are the BYNEL® SERIES 3800 resins commercially available from DuPont (Wilmington, Del.). (including BYNEL® 3810, BYNEL® 3859, BYNEL® 3860, and BYNEL® 3861). A particularly suitable EVA hot melt adhesive is the material available from Bridgestone Corp. (Tokyo, JP) under the trade name EVASAFE®.

Examples of suitable ionomeric adhesives are the "ionoplast resins". Ionoplast resins are copolymers of ethylene and unsaturated carboxylic acids, wherein at least a portion of the acid groups in the copolymer have been neutralized to the salt form of the acid. Extruded sheets of ionoplast resins suitable for use in this disclosure are commercially available from DuPont Chemicals (Wilmington, Del.), under the trade name SENTRYGLASS PLUS.

Examples of suitable polyolefin adhesives include ethylene/α-olefin copolymers. As used herein, the term "ethylene/α-olefin copolymer" refers to polymers comprising a class of hydrocarbons manufactured by the catalytic oligomerization (i.e., polymerization to low-molecular-weight products) of ethylene and linear α-olefin monomers. The ethylene/α-olefin copolymers may be made, for example, with a single site catalyst such as a metallocene catalyst or multi-site catalysts such as Ziegler-Natta and Phillips catalysts. The linear α-olefin monomers typically are 1-butene or 1-octene but may range from C3 to C20 linear, branched or cyclic: α-olefin. The α-olefin may be branched but only if the branch is at least alpha to the double bond. Examples of C3-C20 α-olefins include propylene, 1-butene, 4-methyl-1-butene, 1-hexene, 1-octene, 1-dodecene, 1-tetradecene, 1-hexadecene and 1-octadecene. The α-olefins can also contain a cyclic structure such as cyclohexane or cyclopentane, resulting in an α-olefin such as 3-cyclohexyl-1 propene (allyl cyclohexane) and vinyl cyclohexane. Although not α-olefins in the classical sense of the term, for purposes of this disclosure certain cyclic olefins, such as norbornene and related olefins, are α-olefins and can be used. Similarly, styrene and its related olefins (for example, α-methyl styrene) are α-olefins for the purposes of this disclosure. Acrylic and methacrylic acid as well as their respective ionomers and esters, however are not α-olefins for the purposes of this disclosure. Illustrative ethylene/α-olefin copolymers include ethylene/1-butene, ethylene/1-octene, ethylene/1-butene/1-octene, ethylene/styrene. The polymers can be block or random. Exemplary commercially available low crystalline ethylene/α-olefin copolymers include resins sold under the tradenames ENGAGE ethylene/1-butene and ethylene/1-octene copolymers and FLEXOMER® ethylene/1-hexene copolymer, available from Dow Chemical Co. (Midland Mich.) and homogeneously branched, substantially linear ethylene/α-olefin copolymers such as TAFMER®, available from Mitsui Petrochemicals Company Limited, (Tokyo, Japan), and EXACT, available from ExxonMobil Corp, (Irving, Tex.). As used herein, the term "copolymer" refers to polymers made from at least 2 different monomers.

In some of these embodiments, the α-olefin moiety of the ethylene/α-olefin copolymer includes four or more carbons. In some embodiments, the ethylene/α-olefin copolymer is a low crystalline ethylene/α-olefin copolymer. As used herein, the term "low crystalline" means crystallinity (according to method disclosed in ASTM F2625-07) of less than 50% by weight. In some embodiments, the low crystalline ethylene/α-olefin copolymer is a butene α-olefin. In some embodiments, the α-olefin of the low crystalline ethylene/α-olefin copolymer has 4 or more carbons.

In some embodiments, the low crystalline ethylene/α-olefin copolymer has a DSC peak melting point of less than or equal to 50 degrees C. As used herein, the term "DSC peak melting point" means a melting point determined by DSC (10 degree/min) under nitrogen purge as the peak with the largest area under the DSC curve.

In some embodiments, the adhesive is a pressure sensitive adhesive. Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. A wide range of pressure sensitive adhesives are suitable for use in the constructions of this disclosure. Additional information regarding pressure sensitive adhesives suitable for the shutter embodiments described herein can be found in commonly owned U.S. Pat. Nos. 9,174,237, 6,824,820, 6,664,359, and U.S. Patent Application Publication No. 2017/0198170 which are incorporated herein by reference.

Suitable pressure sensitive adhesives include those based on natural rubbers, synthetic rubbers, styrene block copolymers, polyvinyl ethers, (meth)acrylates, poly-α-olefins, silicones, urethanes or ureas. As with the heat activated adhesives described above, the pressure sensitive adhesive may be optically transparent or optically clear.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade.

Tackifying resins used with natural rubbers generally include but are not limited to wood rosin and its hydrogenated derivatives; terpene resins of various softening points, and petroleum-based resins, such as, the ESCOREZ® 1300" series of C5 aliphatic olefin-derived resins from ExxonMobile Corp. (Irving, Tex.), and "PICCOLYTE® S" series, polyterpenes from Pinova, Inc. (Brunswick Ga.). Not all pressure sensitive adhesives contain tackifying resins, for example, those pressure sensitive adhesives that are self-tacky may not require tackifying resins. Antioxidants, when present, can retard oxidative attack on natural rubber, thereby mitigating loss of the cohesive strength of the natural rubber adhesive. Useful antioxidants include but are not limited to amines, such as N—N' di-β-naphthyl-1,4-phenylenediamine, available as AgeRite® D available from B.F. Goodrich Company, (Charlotte, N.C.) phenolics, such as 2,5-di-(t-amyl) hydroquinone, available as SANTOVAR A, available from Monsanto Chemical Co. (St. Louis, Mo.), tetrakis [methylene 3-(3',5'-di-tert-butyl-4'-hydroxyphenyl) propianate]methane, available as IRGANOX® 1010 from Ciba-Geigy Corp. (New York, N.Y.), and 2-2'-methylenebis (4-methyl-6-tert butyl phenol), available as Antioxidant 2246; and dithiocarbamates, such as zinc dithiodibutyl carbamate. Other materials can be added to natural rubber adhesives for special purposes, wherein the additions can include plasticizers, pigments, and curing agents to partially vulcanize the pressure sensitive adhesive.

Another useful class of pressure sensitive adhesives are those comprising synthetic rubber. Such adhesives are generally rubbery elastomers, which are either self-tacky or non-tacky and require tackifiers.

Self-tacky synthetic rubber pressure sensitive adhesives include for example, butyl rubber, a copolymer of isobutylene with less than 3 percent isoprene, polyisobutylene, a homopolymer of isoprene, polybutadiene, such as TAK-TENE® 220 BAYER available from Lanxess Deutschland GMBH (Leverkusen, Germany) or styrene/butadiene rubber. Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as IRGANOX® 1010 from BASF SE Co. (Ludwigshafen, Germany). An example of a synthetic rubber is AMERIPOL® 1011A, a styrene/butadiene rubber available from B.F. Goodrich (Charlotte, N.C.). Tackifiers that are useful include derivatives of rosins such as FORAL® 85, a stabilized rosin ester from Hercules, Inc. (Wilmington, Del.) the SNOWTACK series of gum rosins from Eka Chemicals (Bohus, Sweden) and the AQUATAC® series of tall oil rosins from Arizona Chemical Co. (Jacksonville, Fla.); and synthetic hydrocarbon resins such as the PICCOLYTE® A series, polyterpenes from Pinova, Inc. (Brunswick, Ga.), the ESCOREZ® 1300 series of C5 aliphatic olefin-derived resins from ExxonMobile Corp. (Irving, Tex.), the ESCOREZ® 2000 Series of C9 aromatic/aliphatic olefin-derived resins from ExxonMobile Corp. (Irving, Tex.), and polyaromatic $C_9$ resins, such as the PICCO 5000 series of aromatic hydrocarbon resins, from Hercules, Inc. (Wilmingon, Del.). Other materials can be added for special purposes, including hydrogenated butyl rubber, pigments, plasticizers, liquid rubbers, such as "VISTANEX® LMMH" polyisobutylene liquid rubber available from ExxonMobile Corp. (Irving, Tex.), and curing agents to vulcanize the adhesive partially.

Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as "KRATON® D1107P", available from Kraton Polymers (Houston, Tex.), and "EUROPRENE® SOL TE 9110", available from Versalis SPA Corp. (San Donato Milanese, Italy); linear styrene-(ethylene-butylene) block copolymers such as "KRATON® G1657", available from Kraton Polymers (Houston, Tex.); linear styrene-(ethylene-propylene) block copolymers such as KRATON® G1750X", available from Kraton Polymers (Houston, Tex.); and linear, radial, and star styrene-butadiene block copolymers such as KRATON® D1118X, available from Kraton Polymers (Houston, Tex.), and EUROPRENE® SOL TE 6205", available Versalis SPA Corp. (San Donato Milanese, Italy). The polystyrene blocks tend to form domains in the shape of spheroids, cylinders, or plates that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as the ESCOREZ® 1300 series available from ExxonMobile Corp (Irving, Tex.) and the WINGTACK® series, available from Total Petrochemicals & Refining USA, Inc., (Houston, Tex.); rosin esters, such as the FORAL® series and the STAYBELITE® Ester 10, both available from Pinova, Inc. (Brunswick, Ga.); hydrogenated hydrocarbons, such as the "ESCOREZ® 5000" series, available from ExxonMobile Corp. (Irving, Tex.); polyterpenes, such as the PICCOLYTE® A series; and terpene phenolic resins derived from petroleum or terpentine sources, such as PICCOFYN® A100", available from Pinova, Inc. (Brunswick, Ga.). Resins that associate with the thermoplastic phase tend to stiffen the pressure sensitive adhesive. Thermoplastic phase associating resins include polyaromatics, such as the PICCO® 6000 series of aromatic hydrocarbon resins, available from Hercules, Inc.; coumarone-indene resins, such as the CUMAR® series, available from Neville Chemical Co. (Pittsburgh, Pa.); and other high-solubility parameter resins derived from coal tar or petroleum and having softening points above about 85 degrees C., such as the AMOCO® 18 series of alphamethyl styrene resins, available from BP Products North America, Inc. (Naperville Ill.), PICCOVAR® 130" alkyl aromatic polyindene resin, available from Eastman Chemical Resins, Inc., (Kingsport Tenn.), and the PICCOTEX® series of alphamethyl styrene/vinyl toluene resins, available from Eastman Chemical Resins, Inc., (Kingsport Tenn.). Other materials can be added for special purposes, including rubber phase plasticizing hydrocarbon oils, such as, TUFFLO® 6056, available from Houston Refining LP Liydondell Refining Co. (Houston, Tex.), Polybutene-8 from Chevron Corp (San Ramon, Calif.), KAYDOL®, available from Sonneborn, LLC (New York, N.Y.), and SHELL-FLEX® 371", available from Shell Oil Co. (Houston, Tex.); pigments; antioxidants, such as IRGANOX® 1010 and IRGANOX® 1076, both available from BASF SE Corp.

(Ludwigshafen, Germany), BUTAZATE®, available from Uniroyal Chemical Co. (Middlebury, Conn.), CYANOX® LDTP, available from Cytec Technology Corp. (Wilmington, Del.), and BUTASAN, available from Monsanto Co. (St. Louis, N.J.); antiozonants, such as NBC, a nickel dibutyldithiocarbamate, available from DuPont (Wilmington, Del.); liquid rubbers such as VISTANEX® LMMH available from ExxonMobile, Corp. (Irving, Tex.), polyisobutylene rubber; and ultraviolet light inhibitors, such as IRGANOX® 1010 available from BASF SE Corp. (Ludwigshafen, Germany) and TINUVIN® P, available from BASF SE Corp. (Ludwigshafen, Germany).

Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether such as LUTANOL M 40, available from BASF SE Corp. (Ludwigshafen, Germany), and "GANTREZ M 574" and GANTREZ 555, available from ISP Technologies, Inc. (Wilmington, Del.); vinyl ethyl ether such as LUTANOL A 25, LUTANOL A 50 and LUTANOL A 100; vinyl isobutyl ether such as LUTANOL 130, LUTANOL 160, LUTANOL IC, LUTANOL 160D and "LUTANOL I 65D; methacrylate/vinyl isobutyl ether/acrylic acid such as ACRONAL 550 D, available from BASF SE Corp. (Ludwigshafen, Germany). Antioxidants useful to stabilize the polyvinylether pressure sensitive adhesive include, for example, IONOX® 30 available from Ionox LLC (Greenwood Village Colo.), IRGANOX® 1010 available from BASF SE Corp. (Ludwigshafen, Germany), and antioxidant ZKF available from Bayer AG (Leverkusen, Germany). Other materials can be added for special purposes as described in BASF literature including tackifier, plasticizer and pigments.

(Meth)acrylate-based pressure sensitive adhesives generally have a glass transition temperature of about −20 degrees C. or less and may comprise from 100 to 80 weight percent of a $C_3$-C12 alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Generally, the (meth)acrylate-based pressure sensitive adhesives comprise from 0 to 20 weight percent of acrylic acid and from 100 to 80 weight percent of isooctyl acrylate. The (meth)acrylate-based pressure sensitive adhesives may be self-tacky or tackified. Useful tackifiers for acrylics are rosin esters such as FORAL® 85, available from Pinova, Inc. (Brunswick, Ga.), aromatic resins such as PICCOTEX® LC-55WK available from Eastman Chemical Resins, Inc., (Kingsport Tenn.), aliphatic resins such as PICCOTAC® 95, available from Eastman Chemical Resins, Inc. (Kingsport, Tenn.), and terpene resins such as α-pinene and .beta.-pinene, available as "PICCOLYTE® A-11 from Pinova, Inc. (Brunswick, Ga.) and ZONAREZ B-100 from Arizona Chemical Company (Tuxedo, N.Y.). Other materials can be added for special purposes, including hydrogenated butyl rubber, pigments, and curing agents to vulcanize the adhesive partially.

Poly-α-olefin pressure sensitive adhesives, also called a poly(l-alkene) pressure sensitive adhesives, generally comprise either a substantially uncrosslinked polymer or a uncrosslinked polymer that may have radiation activatable functional groups grafted thereon. The poly-α-olefin polymer may be self tacky and/or include one or more tackifying materials. If uncrosslinked, the inherent viscosity of the polymer is generally between about 0.7 and 5.0 dL/g as measured by ASTM D 2857-93, "Standard Practice for Dilute Solution Viscosity of Polymers". In addition, the polymer generally is predominantly amorphous. Useful poly-α-olefin polymers include, for example, $C_3$-$C_{18}$ poly (l-alkene) polymers, generally $C_5$-$C_{12}$α-olefins and copolymers of those with $C_3$ or $C_6$-$C_8$ and copolymers of those with $C_3$. Tackifying materials are typically resins that are miscible in the poly-α-olefin polymer. The total amount of tackifying resin in the poly-α-olefin polymer ranges between 0 to 150 parts by weight per 100 parts of the poly-α-olefin polymer depending on the specific application. Useful tackifying resins include resins derived by polymerization of C5 to C9 unsaturated hydrocarbon monomers, polyterpenes, synthetic polyterpenes and the like. Examples of such commercially available resins based on a $C.sub._5$ olefin fraction of this type are "WINGTACK® 95" and "WINGTACK® 15" tackifying resins available from Total Petrochemicals & Refining USA, Inc., (Houston, Tex.). Other hydrocarbon resins include REGALREZ® 1078 and REGALREZ® 1126 available from Eastman Chemicals, Inc., (Kingsport, Tenn.) and ARKON® P115 available from Arakawa Chemical Co. (Osaka, Japan) Other materials can be added for special purposes, including antioxidants, fillers, pigments, and radiation activated crosslinking agents.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups ($OSiMe.sub.3$) and also contains some residual silanol functionality. Examples of tackifying resins include SR 545, from General Electric Co., Silicone Resins Division, (Waterford, N.Y.), and MQD-32-2 from Shin-Etsu Silicones of America, Inc., (Torrance, Calif.) Other materials can be added for special purposes, including, pigments, plasticizers, and fillers. Fillers are typically used in amounts from 0 parts to 10 parts per 100 parts of silicone pressure sensitive adhesive. Examples of fillers that can be used include zinc oxide, silica, carbon black, pigments, metal powders and calcium carbonate. One suitable class of siloxane-containing pressure sensitive adhesives are those with oxamide terminated hard segments.

One particularly suitable class of optically clear pressure sensitive adhesives are (meth)acrylate-based pressure sensitive adhesives and may comprise either an acidic or basic copolymer. In many embodiments, the (meth)acrylate-based pressure sensitive adhesive is an acidic copolymer. Generally, as the proportion of acidic monomers used in preparing the acidic copolymer increases, cohesive strength of the resulting adhesive increases. The proportion of acidic monomers is usually adjusted depending on the proportion of acidic copolymer present in the blends of the present disclosure.

To achieve pressure sensitive adhesive characteristics, the corresponding copolymer can be tailored to have a resultant glass transition temperature (Tg) of less than about 0 degrees C. Particularly suitable pressure sensitive adhesive copolymers are (meth)acrylate copolymers. Such copolymers typically are derived from monomers comprising about 40% by weight to about 98% by weight, often at least 70% by weight, or at least 85% by weight, or even about 90% by weight, of at least one alkyl (meth)acrylate monomer that, as a homopolymer, has a Tg of less than about 0 degrees C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl acrylate, and mixtures thereof. Optionally, other vinyl monomers and alkyl (meth)acrylate monomers which, as homopolymers, have a Tg greater than 0 degrees C., such as methyl acrylate, methyl methacrylate, isobornyl acrylate, vinyl acetate, styrene, and the like, may be utilized in conjunction with one or more of the low Tg alkyl (meth)acrylate monomers and copolymerizable basic or acidic monomers, provided that the Tg of the resultant (meth)acrylate copolymer is less than about 0 degrees C.

In some embodiments, it is desirable to use (meth)acrylate monomers that are free of alkoxy groups. Alkoxy groups are understood by those skilled in the art.

When used, basic (meth)acrylate copolymers useful as the pressure sensitive adhesive matrix typically are derived from basic monomers comprising about 2% by weight to about 50% by weight, or about 5% by weight to about 30% by weight, of a copolymerizable basic monomer. Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinylpyrrolidone, N-vinylcaprolactam, acrylonitrile, N-vinylformamide, (meth)acrylamide, and mixtures thereof.

When used to form the pressure sensitive adhesive matrix, acidic (meth)acrylate copolymers typically are derived from acidic monomers comprising about 2% by weight to about 30% by weight, or about 2% by weight to about 15% by weight, of a copolymerizable acidic monomer. Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, beta-carboxyethyl acrylate, 2-sulfoethyl methacrylate, styrenesulfonic acid, 2-acrylamido-2-methylpropanesulfonic acid, vinylphosphonic acid, and the like, and mixtures thereof. Due to their availability, typically ethylenically unsaturated carboxylic acids are used.

In certain embodiments, the poly(meth)acrylic pressure sensitive adhesive matrix is derived from between about 1 and about 20 weight percent of acrylic acid and between about 99 and about 80 weight percent of at least one of isooctyl acrylate, 2-ethylhexyl acrylate or n-butyl acrylate composition. In some embodiments, the pressure sensitive adhesive matrix is derived from between about 2 and about 10 weight percent acrylic acid and between about 90 and about 98 weight percent of at least one of isooctyl acrylate, 2-ethylhexyl acrylate or n-butyl acrylate composition.

Another useful class of optically clear (meth)acrylate-based pressure sensitive adhesives are those which are (meth)acrylic block copolymers. Such copolymers may contain only (meth)acrylate monomers or may contain other co-monomers such as styrenes.

When used as a primer, layer 440 may be used to increase the adhesion between the non-conductive layer 411 and the adhesive layer 430. A wide variety of primers are suitable. If used as a primer, the type of layer 440 may be selected based on the composition of the non-conductive layer 411 as well as the composition of the adhesive layer 430. For example, a number of primer technologies that have been used to provide improved adhesion between polyester-based substrates and functional coatings, such as adhesive layers, applied to them are: the use of aminosilane coatings to improve the adhesion at subfreezing temperatures as described in U.S. Pat. No. 5,064,722 (Swofford et al.); PET (polyethylene terephthalate) films primed with polyallylamine coatings to improve adhesion to the PET film of a polyvinyl butyral or ionoplast resin layer; glass laminates for reduction of sound transmission that may include 3-layer laminates of polyester film positioned between two dissimilar polymer layers; and the primer layers for multi-layer optical films where the primer layer may include a sulfopolyester and a crosslinker.

Referring again to FIGS. 2A and 2B, in some embodiments, the sheets 210, 220 may exhibit a high sticking force in the closed state (see FIG. 2B). This high sticking force may make it more difficult for the open state to be restored when the applied electrical potential is removed or reduced. A wide range of layers 450, and particularly release coating layers, are suitable to be disposed upon the layer 411, particularly when layer 411 is polymeric. Particularly suitable release coatings include materials such as is used on the back side of rolled tape products to permit the tape to be rolled up and remain intact and then to be unwound for use. Such materials are sometimes called Low Adhesion Backsizes or LABs. A wide variety of LABs have been developed for use with a wide variety of adhesives. Examples of suitable LAB or release coatings that are suitable for use in the cover tape constructions of this disclosure include: the water-based fluorochemical materials described in U.S. Pat. No. 7,411,020 (Carlson et al.); the polysiloxane release coatings described in U.S. Pat. No. 5,753,346 (Lein et al.); the release compositions describe in U.S. Pat. No. 7,229,687 (Kinning et al.); the polyvinyl N-alkyl carbamates (polyurethanes) described in U.S. Pat. No. 2,532,011 (Dalquist et al.); the moisture-curable materials described in U.S. Pat. No. 6,204,350 (Liu et al.); and the organopolysiloxane-poyurea copolymer release agents described in U.S. Pat. No. 5,290,615 (Tushaus et al.)

In some cases, it may be useful to reduce the overall area of surface contact between the surfaces of the adjacent sheets (see sheets 210, 220 shown in FIGS. 2A and 2B). A reduction in overall area of surface contact may be achieved by a number of approaches. One such approach involves texturing the surface of one or both of the adjacent sheets such that the surface retains small features, e.g., features in a size range of about 1 to about 100 nanometers. Examples of surface texturing approaches include applying a coating of very small beads or particulates, embossing very small surface features, and/or scratching or abrading the surface.

Alternatively or in addition to, the release layers described for the non-conductive layer 411, a coating of a release material on the conductive layer 412, 423 such as a fluoropolymer can reduce stiction between the sheets. Such a release coating may be several nanometers thick, e.g., in a range of about 3 to about 10 nanometers.

Additional information about suitable coatings and/or layers 423, 424, 430, 440, 411, 450 useful for the sheets 401, 402, 403 are described U.S. Patent Application Publication No. 2017/0051185 which is incorporated herein by reference.

Figure 5:
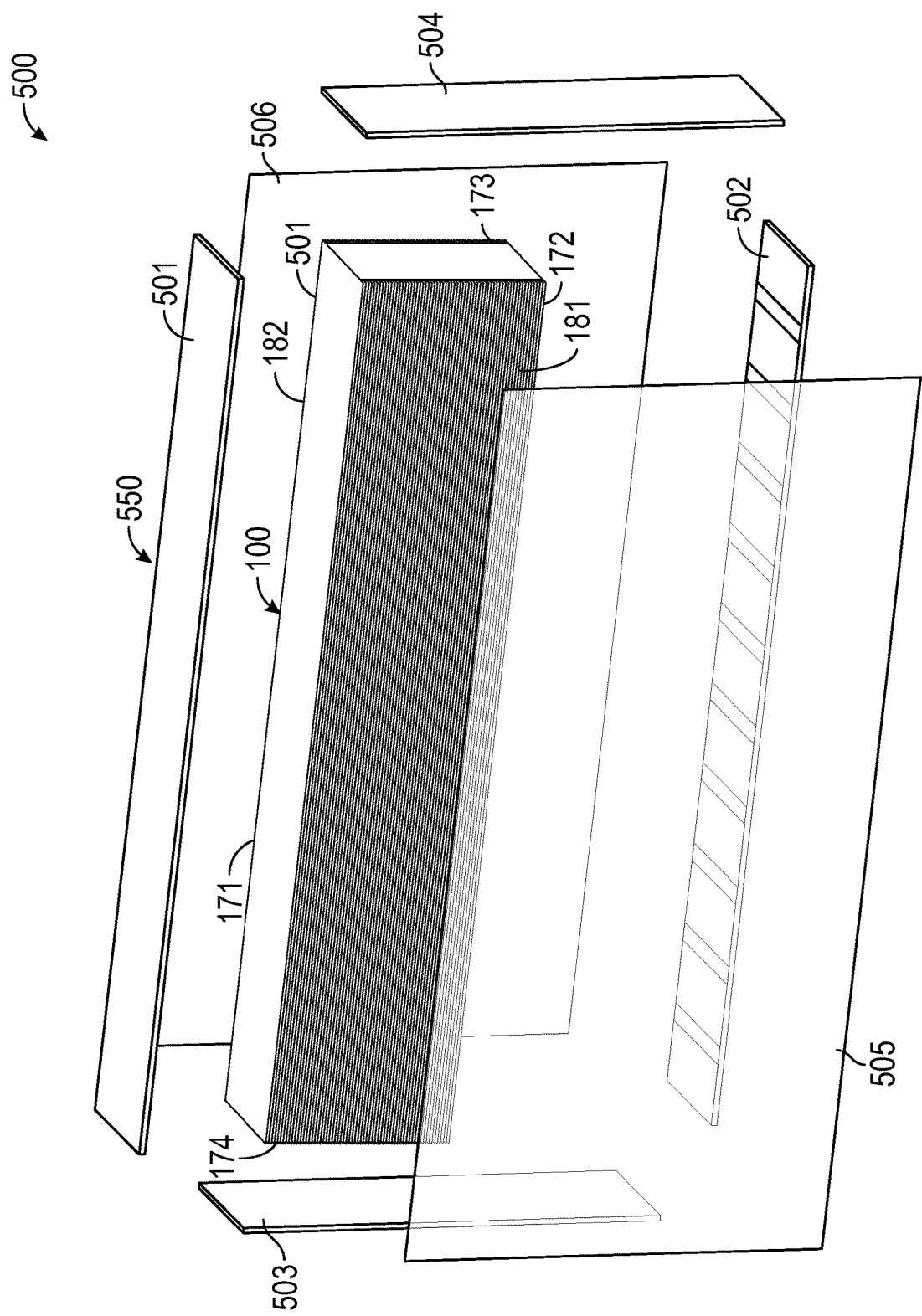
FIG. 5 is an electrically controlled shutter assembly that incorporates the array shown in FIGS. 1A through 1C.

Some embodiments are directed to shutter 500 that includes a cell array 100 disposed within a support frame 550, as illustrated in FIG. 5. The shutter 500 may be implemented as one or both of a light control shutter and/or a thermal insulation control shutter. In some embodiments, the array 100 may be substantially light transmissive, may be translucent and colored, or may be opaque.

The support frame 550 may comprise one or more frame elements 501, 502, 503, 504. In some embodiments, as depicted in FIG. 5, the cell array 100 is rectangular and has a first edge 171, a second edge 172 opposite the first edge 171, a third edge 173 and a fourth edge 174 opposite the third edge 173. The third and fourth edges 173, 174 are substantially perpendicular to the first and second edges 171, 172. The array 100 also has a front surface 181 and a back surface 182 opposite the front surface 181.

The support frame 550 has at least one of first 501, second 502, third 503, and fourth 504 frame elements respectively disposed along array edges 171, 172, 173, 174. The support frame 550 may be fabricated from any material that provides for structural support of the array 100 such as plastic, acrylic, metal, glass, wood, etc. In some embodiments, the support frame is fabricated from materials having a low thermal conductance.

In some embodiments, the support frame 550 includes first frame element 501 and the array 100 is mechanically coupled to the first frame element 501 such that the array expands away from the first frame element 501 and compresses toward the first frame element 501. In some embodiments, the shutter 500 may include one or both of a front plate 505 disposed along the front surface 181 of the array 100 and/or a second plate 506 disposed along the back surface 182 of the array 100. The frame elements 501, 502, 503, 504 and the front and back plates 505, 506 may be sealed together and filed which has a lower thermal conductivity than air, such as argon. In embodiments in which the shutter 500 serves as a thermal insulator, the insulation value of the shutter 500 may be greater than about R-5 (RSI 0.88) or may be at least R-15 (RSI 2.64).

The front and back plates 505, 506 may be supported by frame elements 501, 502, 503, 504, and attached to the frame elements 501, 502, 503, 504 by an adhesive layer, a retaining edge groove or any suitable means. The plates 505, 506 may be fabricated from a light transmissive or light opaque material. For embodiments in which the plates are light transmissive, the plates 505, 506 may be made of glass, acrylic plastic, ethylene tetrafluoroethylene sheet, or polycarbonate plastic sheeting. The material utilized for plates 505, 506 can be made of a material that is easily cleaned to remove dust and dirt that may collect on the exterior surfaces of the plates 505, 506.

In some embodiments the plates 505, 506 may not have high light transmissive properties. The plates 505, 506 may be translucent such that light is diffused by the plates 505, 506. In some embodiments, the plates 505, 506 can be opaque, such as when the shutter is used within a wall or as a wall panel rather than as a window.

Figure 6A:
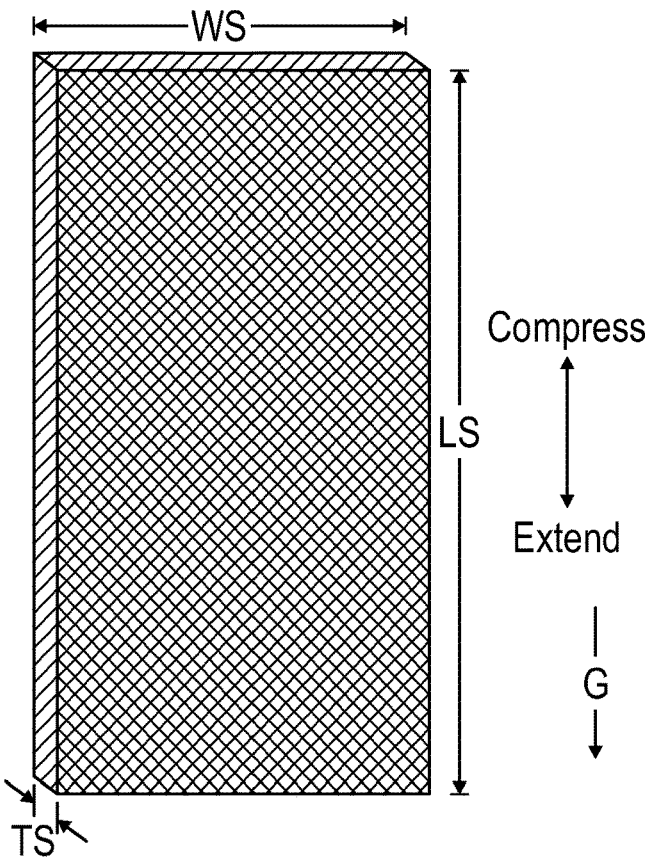
FIGS. 6A and 6B show several orientations of a shutter assembly in accordance with some embodiments.
Figure 6B:
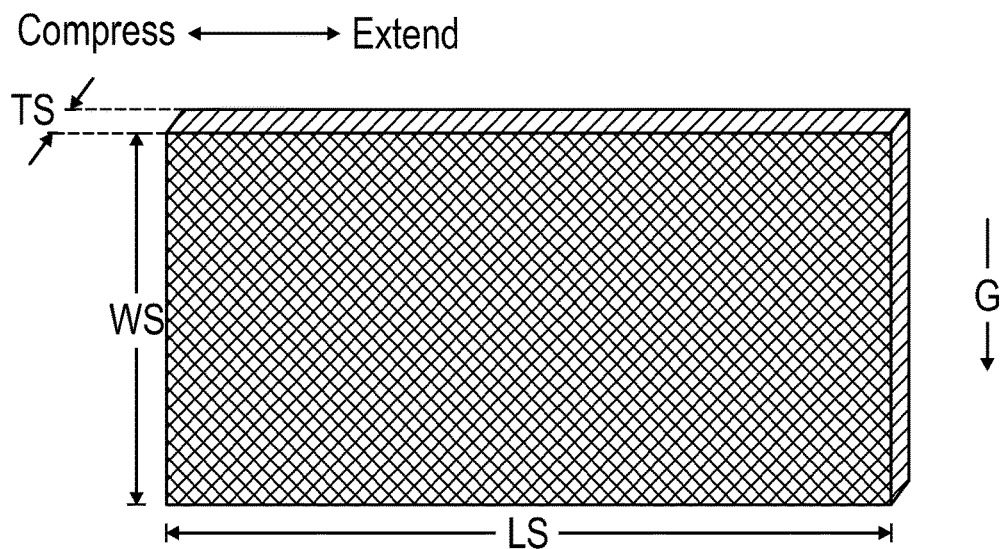

A light/heat control shutter as disclosed herein can extend and compress in any suitable direction. For example, FIGS. 6A and 6B illustrate possible orientations of a shutter 601, 602 that includes a cell array, frame, front plate and/or back plate. As shown in FIGS. 6A and 6B, the shutter 601, 602 has a thickness, TS, a width, WS, and a length, LS wherein the shutter extends and compresses along its length. In general, WS<TS<LS. In some applications WS ranges from about 15 cm (6 in) to about 1.2 m (4 ft), LS ranges from about 30.5 cm (1 ft) to about 3 m (10 ft), and/or TS ranges from about 2.5 cm (1 in) to about 30.5 cm (12 in). For a typical greenhouse application as, WS may be about 45.7 cm (18 in); LS is about 2.4 m (8 ft), and TS is about 10.2 cm (4 in). The longitudinal direction of the cells in the shutter 601, 602 of the may extend along the width of the shutter 601, 602 or along the thickness of the shutter 601, 602. In some orientations, as illustrated in FIG. 6A, the shutter 601 extends and compresses substantially along the direction of the force of gravity, indicated by the arrow G. However, this orientation may not be optimal in all implementations. As illustrated in FIG. 6B, the shutter 602 may extend and compress at other angles with respect to G, such as substantially perpendicular to G. In some arrangements, the shutter may expand and compress along a direction that is substantially parallel to the plane of the window or wall. In some arrangements, the shutter may expand and compress along a direction that is substantially perpendicular to the plane of the window or wall.

Figure 7:
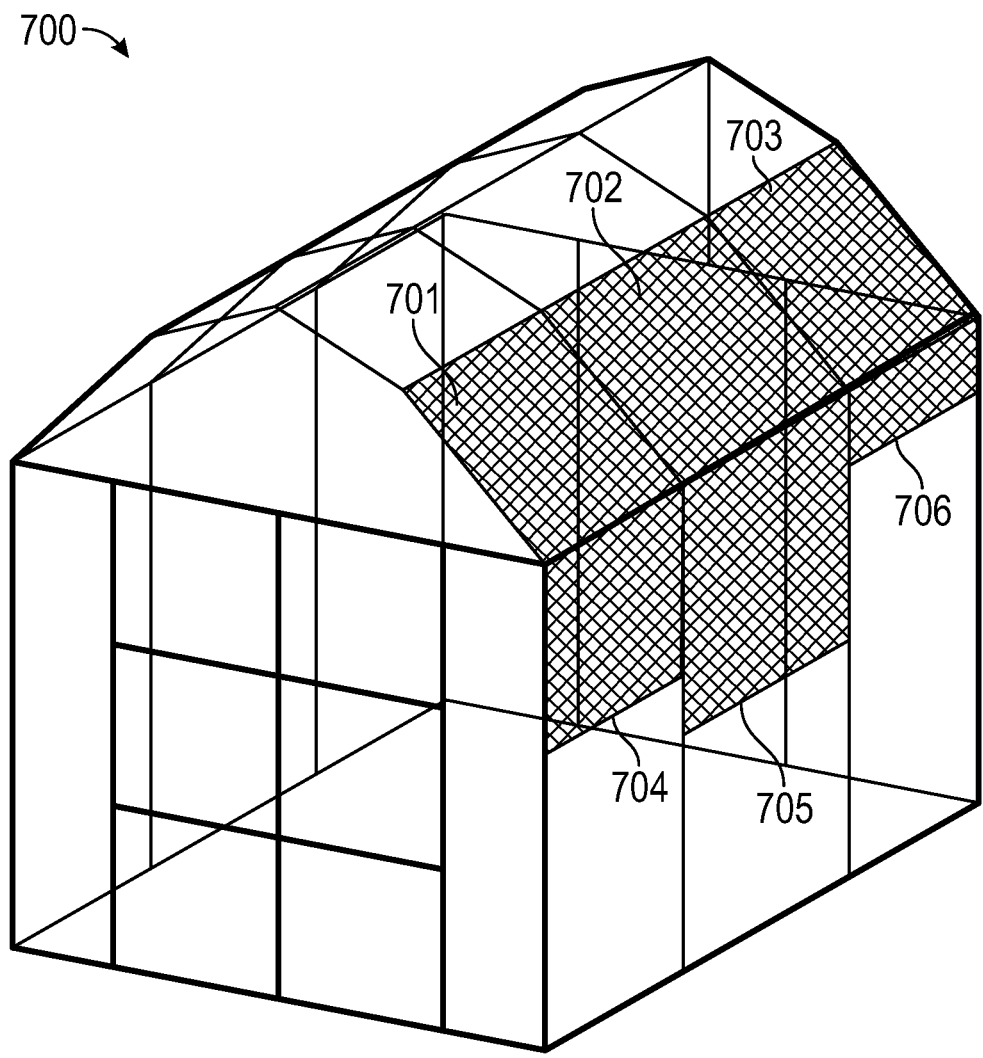
FIG. 7 illustrates shutter assemblies in a greenhouse application according to some embodiments.
Figure 8A:
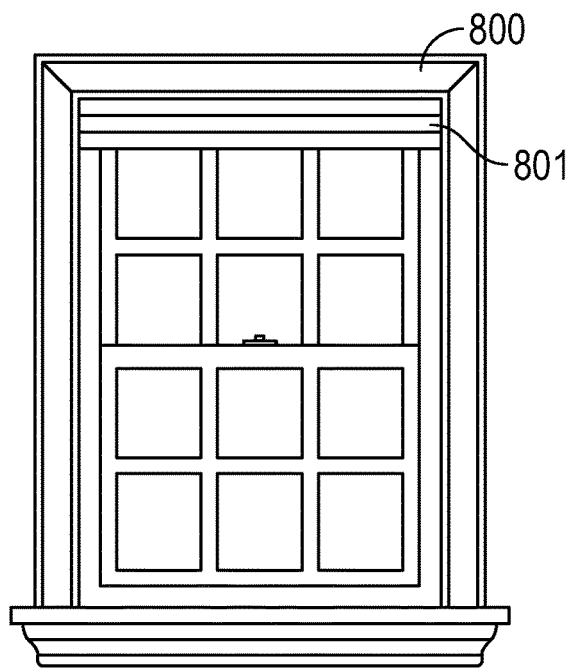
FIGS. 8A and 8B and 9A and 9B show shutter assemblies used in conjunction with a dwelling window according to some embodiments.
Figure 8B:
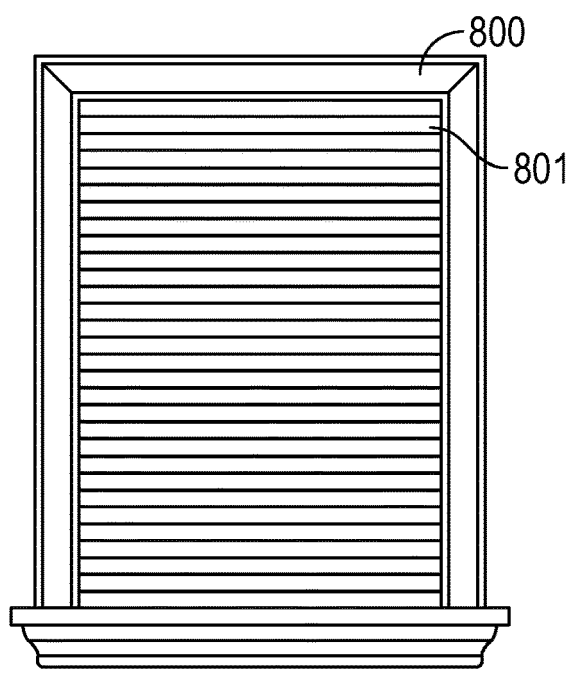
Figure 9A:
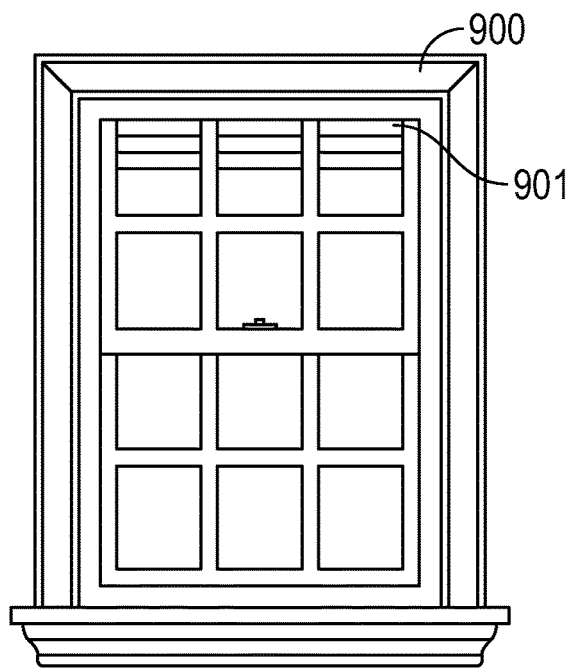
Figure 9B:
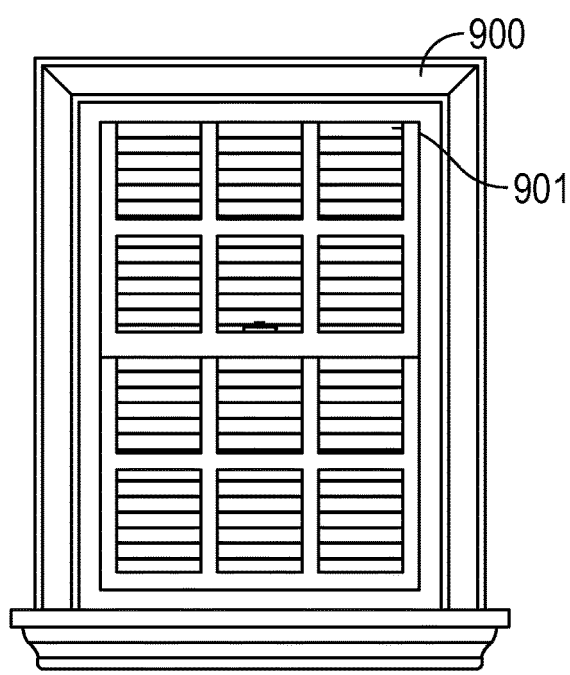
Figure 10:
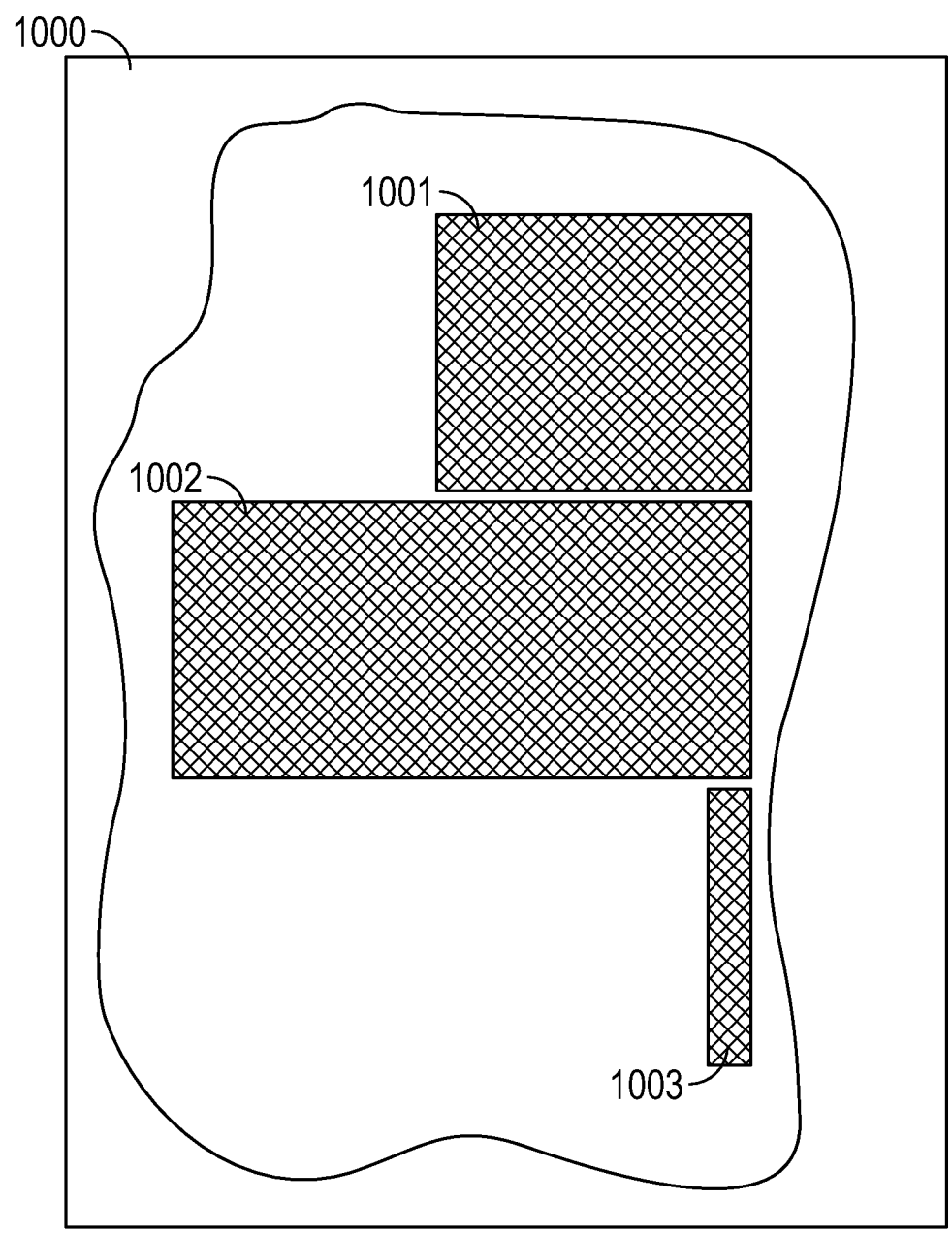
FIG. 10 shows shutter assemblies deployed within an opaque structural element such as the wall of a building according to some embodiments.

The shutter described herein may be useful in a dwelling, a glasshouse, a greenhouse, or in other types of buildings or structures. In various embodiments, the shutter may be used within or in front of windows or other light transmitting surfaces and/or within opaque walls of structures to control light and/or to vary thermal insulation. In applications in which the shutter is used in conjunction with a light transmitting structure, the shutter may vary thermal insulation, visible light transmission, or both. For example, in some embodiments a light transmissive shutter may be expanded to increase thermal insulation to reduce heat loss from the structure, while maintaining some visible light transmission through the shutter. In some embodiments, expansion of the cell array may reduce the visible light transmission through the shutter by a specified amount, e.g., less than 20% or less than 50% of the light transmission through the shutter when the cell array is compressed, FIG. 7 illustrates use of the shutters 701-706 in a greenhouse 700. The shutters 701-706 can be installed inside the greenhouse against existing greenhouse window panels that transmit and/or diffuse light. Alternatively, the shutters can be incorporated within greenhouse panels. FIGS. 8A and 8B show a shutter 801 in a compressed state and an extended state, respectively, in front of a window 800. FIGS. 9A and 9B show an extended (FIG. 9A) and compressed (FIG. 9B) shutter 901 between two panes of glass of a dwelling window 900. In some configurations, the shutters disclose herein may be used as a component of a "smart wall" or other opaque structure that is capable of providing variable thermal insulation. FIG. 10 shows shutters 1001-1003 disposed between various opaque materials (not shown) that make up wall 1000 or other structure providing controllable, variable thermal insulation within the wall 1000.

In other embodiments, the shutter can be deployed in a skylight to control the amount of light entering the dwelling, or the thermal insulation of the skylight, especially, during sunny winter months.

Figure 11:
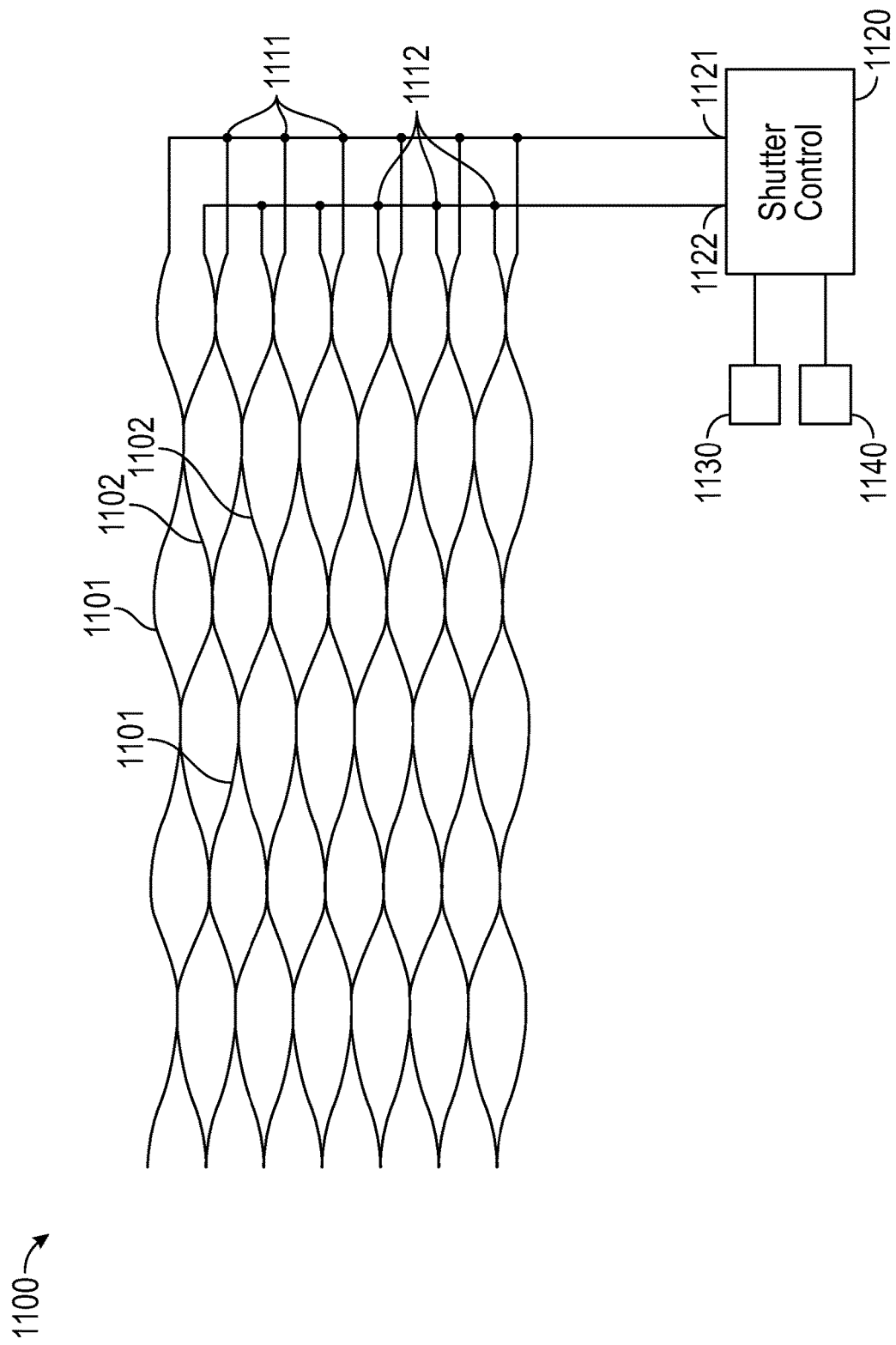
FIG. 11 is a diagram illustrating a system that includes a shutter and a shutter controller according to some embodiments.

FIG. 11 shows portions of a shutter system comprising a shutter 1100 and shutter control power supply 1120. The electrically conductive layers of the first sheets 1101 of each pair of sheets 1101, 1102 of the shutter 1100 are connected through connections 1111 to a first terminal 1121 of the shutter control power supply 1120. The electrically conductive layers of the second sheets 1102 of each pair of sheets 1101, 1102 of the shutter 1100 are connected through connections 1112 to a second terminal 1122 of the shutter control power supply 1120. The shutter control power supply 1120 is configured to apply a varying the electric potential across first and second terminals 1121, 1122 such that the shutter 1100 compresses or expands in response to the applied electric potential.

According to some embodiments, the power supply 1120 may be controlled by a controller 1130 that adjusts the level of the applied electric potential to expand or compress the shutter. For example, controller 1130 can be manual in which case it may be used to fully expand the shutter, fully compress the shutter or partially expand shutter to one or more partial expansion positions when the appropriate input is provided by a user.

Additionally, or alternatively, the shutter control system may include a sensor 1140 configured to control the expansion and/or compression of the shutter. For example, the sensor 1140 may sense light, temperature, or both. In response to the sensed condition, the sensor sends a control signal to the controller 1130 that in turn automatically causes the power supply 1120 to output an electric potential that expands or compresses the shutter according to the level of the control signal. The sensor 1140 and/or the controller 1130 may be communicatively coupled to the power supply 1120 by a wired or wireless connection.

Figure 12:
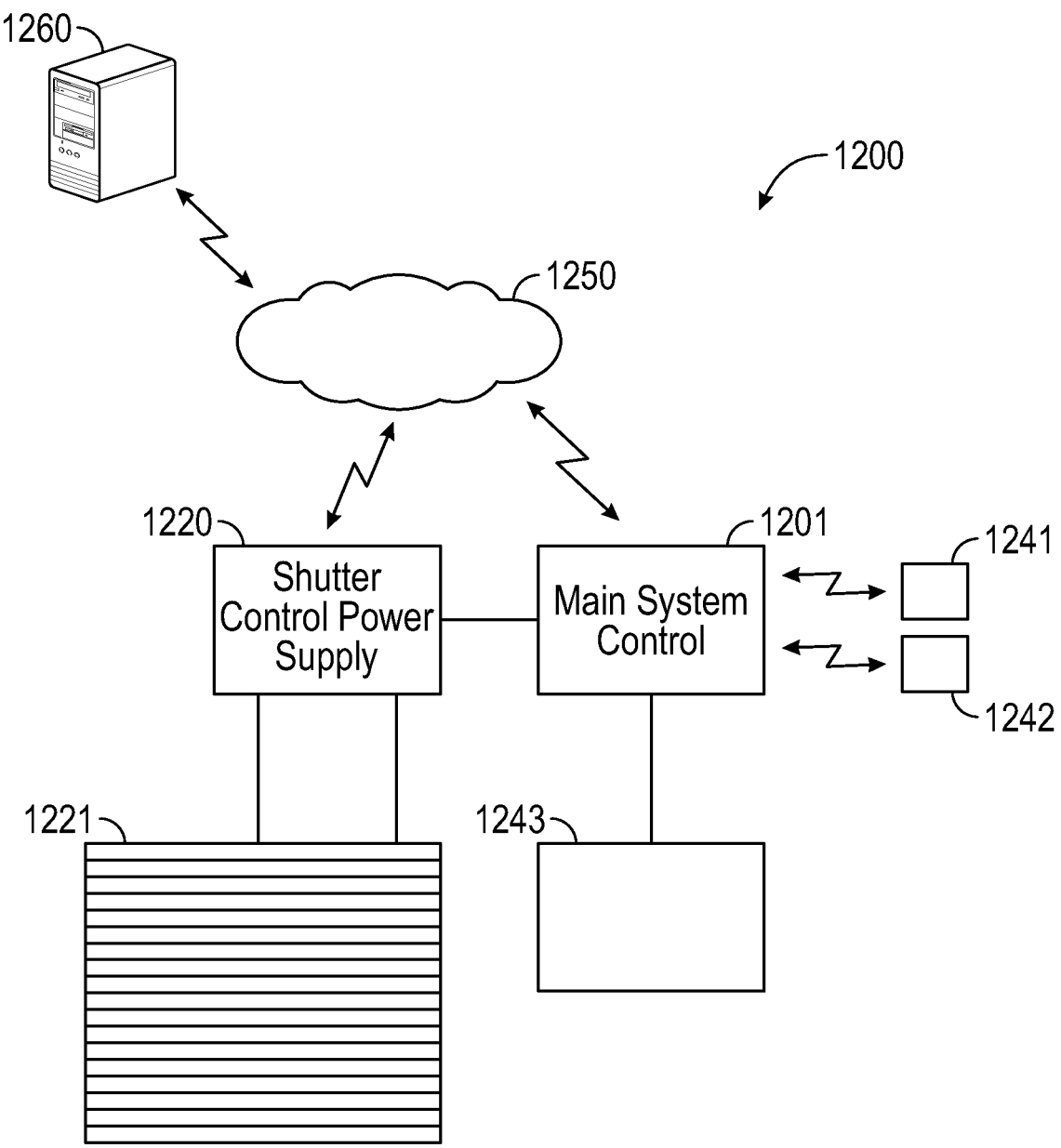
FIG. 12 is a diagram illustrating a web-based environmental control system that includes an electrically controllable shutter according to some embodiments.

As depicted in FIG. 12, the shutter control power supply 1220 and shutter 1221 may a component of a web-connected 1250 environmental control system 1200. The environmental control system 1200 includes a main system controller 1201 configured to control heating, ventilation and air conditioning of a building or structure. The shutter control power supply 1220 can be coupled by a wired or wireless connection to a main system controller 1201. The main system controller 1201 sends signals to the shutter control power supply 1220 to control the position of the shutter 1221. The main system controller 1201 can receive information from sensors 1241, 1242, a user interface 1243, and/or from a remote server 1260 connected to the controller 1201 through the internet. The main controller 1201 may control the shutter control power supply 1220 based on analysis any or all of these information inputs. For example, the web-based server 1260 may provide predicted or actual weather information, such as temperature, humidity, wind speed, and/or cloud cover, and the main controller 1201 can control the shutter based on information obtained from the web-based server 1260.

Figure 13A:
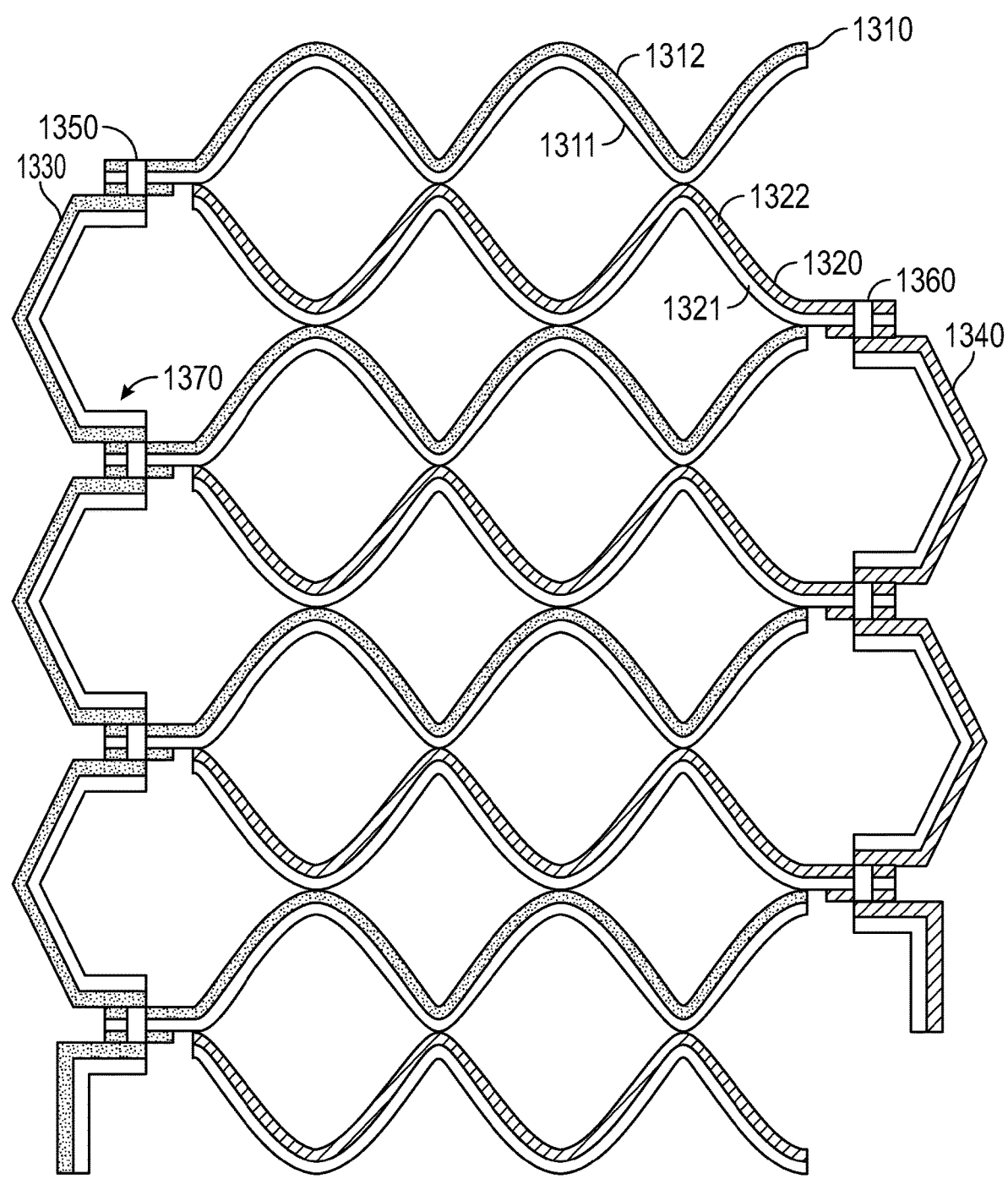
FIGS. 13A and 13B respectively show expanded and compressed cell array having first sheets electrically connected by first connecting sheets and vias and having second sheets electrically connected by second connecting sheets and vias according to some embodiments.
Figure 13B:
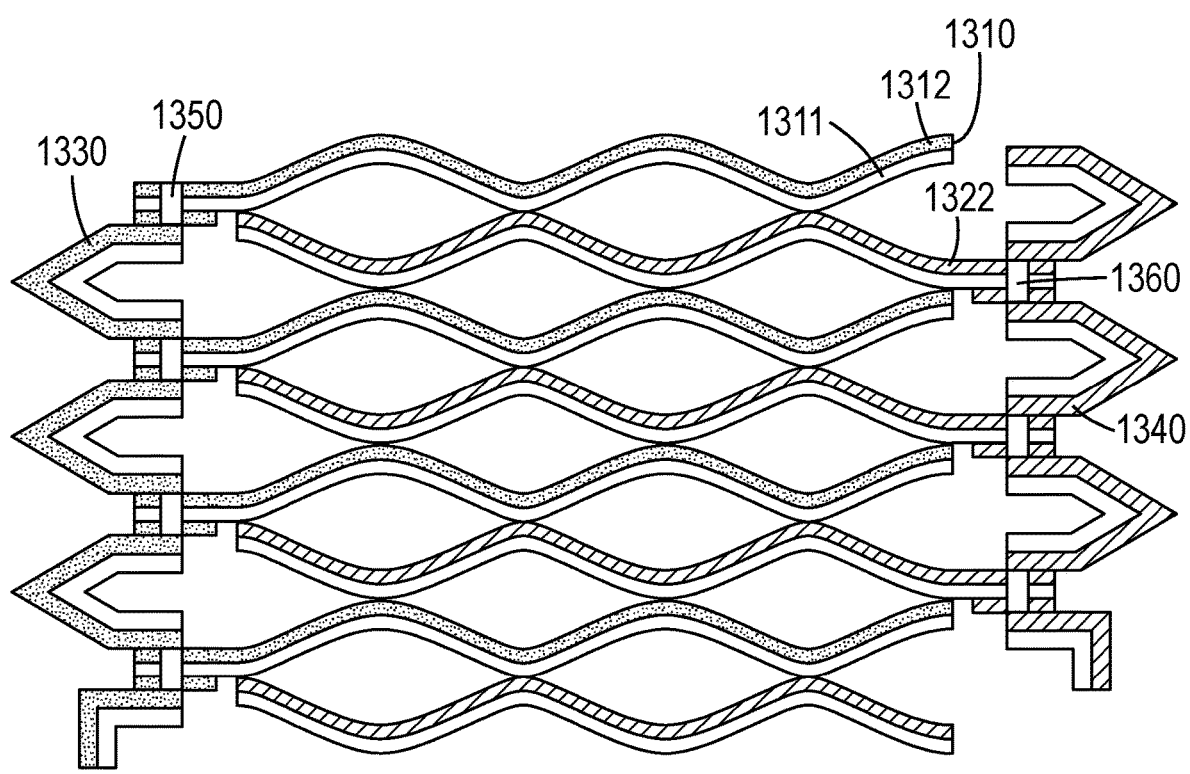

FIGS. 13A and 13B are diagrams illustrating electrical connections between the electrically conductive layers of the sheets of an array using a flexible via. FIG. 13A and FIG. 13B show a number of pairs of first 1310 and second sheets 1320. Each first sheet 1310 has an electrically non-conductive layer 1311 and an electrically conductive layer 1312. Each second sheet 1320 has an electrically non-conductive layer 1321 and an electrically conductive layer 1322. The electrically conductive layers 1312 of the first sheets 1310 are electrically connected together by first flexible connector sheets 1330. Flexible via 1350 electrically connect the electrically conductive layers 1312 of the first sheets 1310 to the first connector sheets 1330. The electrically conductive layers 1322 of the second sheets 1320 are electrically connected together by second flexible connector sheets 1340. Via 1360 electrically connect the electrically conductive layers 1322 of the first sheets 1310 to the second connector sheets 1340. Electrical connections of the electrically conductive layers which are made by the flexible connector sheets 1330, 1340 and the flexible vias 1350, 1360 allow for expansion and compression of the cell array without substantial distortion of the shape of the array, which is generally rectangular in this illustration. The flexible connector sheets 1330, 1340 have a length that allows the array to fully expand (as shown in FIG. 13A) and flex to allow the array to fully compress (as shown in FIG. 13B).

Figure 13C:
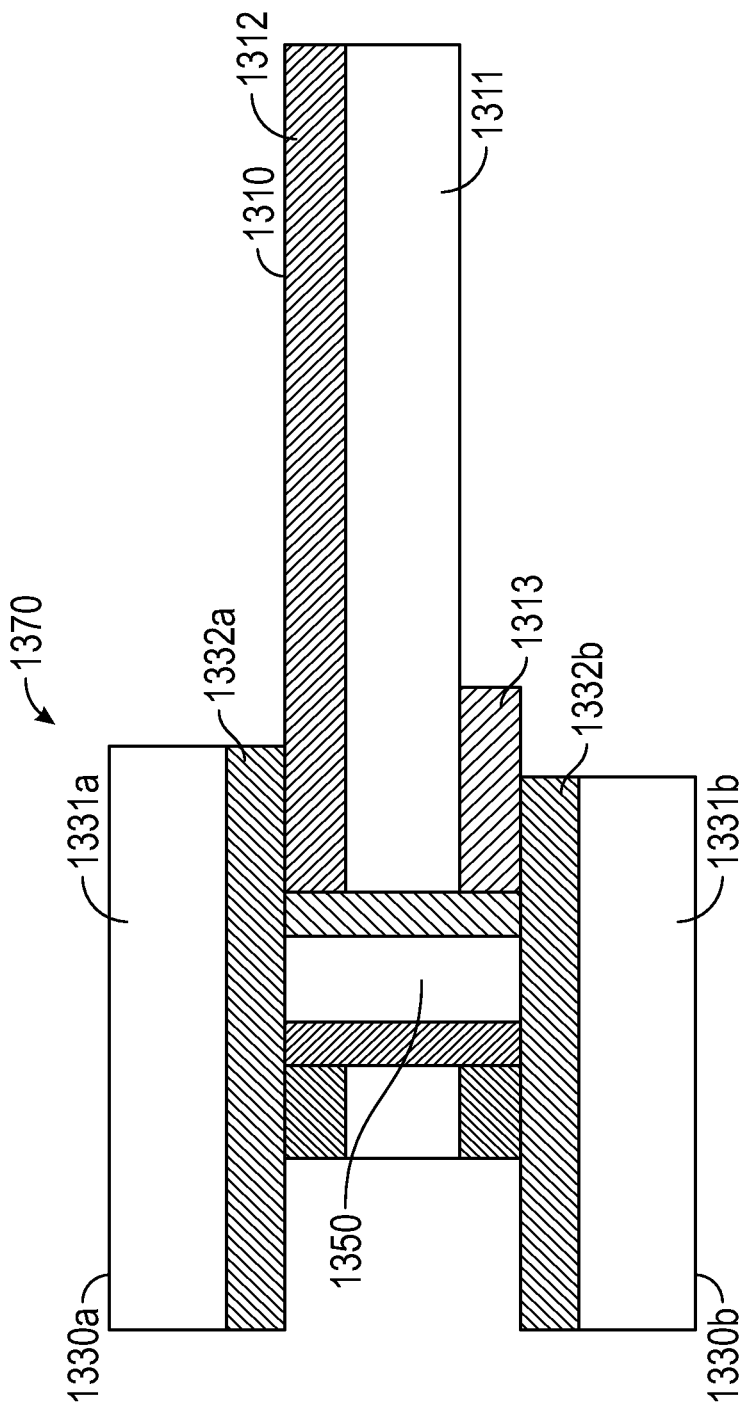
FIG. 13C is a more detailed view of the vias of FIG. 13A.

FIG. 13C is a close-up view of an electrical connection region 1370 which is also shown in FIG. 13A. Connection 1370 includes an upper first connector sheet 1330a, a lower first connector sheet 1330b and a first sheet 1310 of the cell array disposed between the upper first connector sheet 1330a and the lower first connector sheet 1330b. A via 1350 transverses the electrically non-conductive layer 1311 of the first sheet 1310 and electrically connects the electrically conductive layer 1312 disposed on the top surface of the first sheet 1310 to an auxiliary layer 1313 disposed on the lower surface of the non-conductive layer 1311. The upper first connection sheet 1330a, lower first connection sheet 1330b and first sheet 1310 are bonded together at each connection region 1370.

The upper and lower first connector sheets 1330a, 1330b may be similar in structure to the first and second sheets 1310, 1320, having an electrically conductive layer 1332a, 1332b disposed on an electrically non-conductive layer 1331a, 1331b. The electrically conductive layer 1332a of the first connector layer 1330a is bonded to the electrically conductive layer 1312 of the first sheet, the electrically conductive layer 1332b of the second connector layer 1330b is bonded to the electrically conductive auxiliary layer 1313 of the first sheet; and the via electrically connects the electrically conductive layers 1312 to the electrically conductive auxiliary layer 1313. In this manner, each of the conductive layers 1312 of the first sheets 1310 are electrically connected together and each of the conductive layers 1322 of the second sheets 1320 are electrically connected together.

Figure 14A:
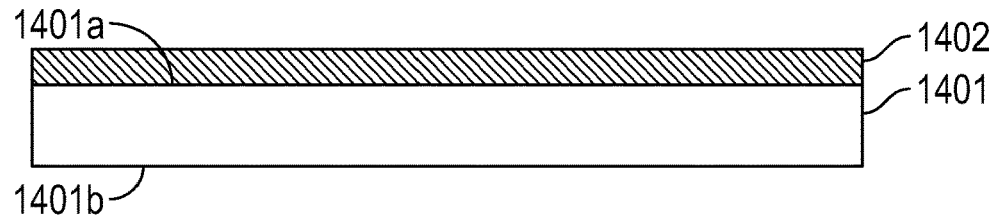
FIGS. 14A through 14C are conceptual diagrams that illustrate a process of making the flexible via according to some embodiments.
Figure 14B:
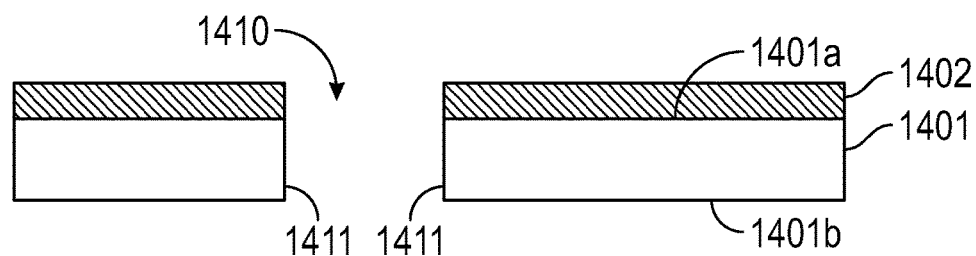
Figure 14C:
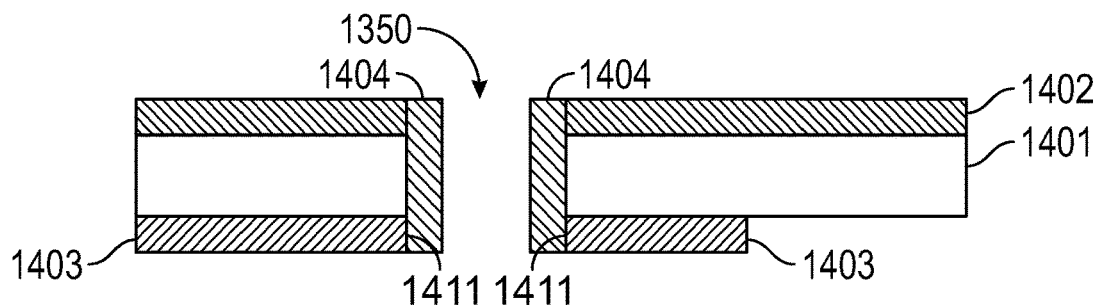

FIGS. 14A through 14C illustrate a process of making the flexible via 1350. FIG. 14A shows a flexible sheet 1400 having an electrically non-conductive layer 1401 and an electrically conductive layer 1402. For example, the non-conductive layer 1401 of FIG. 14A may be similar to the non-conductive layer any of the sheets shown in FIGS. 4A through 4C. In some embodiments, one or both surfaces 1401a, 1401b of the non-conductive layer 1401 may be smooth, or one or both of the surfaces 1401a, b may have macro or micro geometry such as grooves, channels posts, or the like. The electrically conductive layer 1402 may be similar to the non-conductive layers previously described with reference to FIGS. 4A through 4C.

A hole 1410 is formed in the sheet 1400, e.g., by punching, laser drilling, ion milling, die cutting, as shown in FIG. 14B. For example, the hole may be in a range of about 0.1 inches (0.25 cm) to about 0.15 inches (0.381 cm) some embodiments. After formation of the hole 1410, the uncoated surface 1401b of the non-conductive layer 1401 is coated with an electrically conductive material forming an electrically conductive auxiliary layer 1403. The electrically conductive material may be or comprise a non-metal material. The non-metal material may be the same material or a different material from the non-metal material of layer 1402.

The auxiliary layer 1403 is formed by mechanically polishing or buffing the surface 1401b with the electrically conductive material. The auxiliary layer extends partially but not completely across the surface 1401b. In some embodiments, the electrically conductive material used to form the auxiliary layer 1403 may include particles. The particles of the auxiliary layer 1403 may be exfoliatable particles that break up into flakes, scales, sheets or layers upon application of shear force. Suitable particle-containing materials include carbon-based materials such as graphite, GLC and/or carbon black. In this case, the mechanical polishing of the surface 1401a with the particle-containing material imparts the auxiliary layer 1403 in the form of a nano-scale coating of the particle-containing material on the surface 1401b. The buffing also forces the material into the hole 1410. This transforms the hole 1410 (FIG. 14B) into via 1350 (FIG. 14C) by forming a coating 1404 of the material on sides 1411. The coating 1404 is electrically conductive and creates an electrically conductive via 1350 connecting the electrically conducting layers 1402, located on one side of electrically non-conducting layer 1401, and auxiliary layer 1403, which is also electrically conducting, located on the other side of the electrically non-conductive layer 1401. The processes and materials described herein can provide a substantially pure coating of the electrically conductive material as the auxiliary layer 1403 without needing a binder. For purposes of this disclosure, a composition to be coated is considered to not contain a binder if 20 g of the composition stored for 3 days at a temperature of 25° C. and relative humidity of 40% does not agglomerate.

In some embodiments, the exfoliating particles are combined with buffing aid particles that have a dimensional aspect ratio of about 1. The buffing aid particles can be spherical and/or may have an average largest dimension of between about 0.1 microns to about 10 microns or between about 0.5 microns to about 2 microns. For example, the buffing aid particles may have an average largest dimension in the same order of magnitude as the average largest dimension of the exfoliatable particle. In some embodiments, the buffing aid particles have a low affinity for the surface 1401b of the non-conductive layer 1401 and a low affinity for the exfoliatable particles. A particle is considered to have a low affinity for a surface if the particles will not stay on the substrate by themselves if buffed on the substrate using the disclosed methods of buffing. Such buffing aid particles tend to separate from the exfoliatable particles during the buffing process, and help the distribution and uniformity of the exfoliatable particles on the surface 1401b. In some implementations, it can be useful if the finished auxiliary layer 1403 does not contain a large amount of the buffing aid particles. Examples of buffing aid particles include Radiant® MP series encapsulated dye particles from Radiant Color Co. (Richmond, Calif.), such as magenta, MP orange, MP chartreuse, and clear particles. Other buffing aid particles include Methyl red dye particles having a CAS number of 493-52-7, Methylene blue dye particles having a CAS number of 75-09-2, Perylene red pigment, Rhodamine B dye having a CAS number of 81-88-9, Malachite green oxalate having a CAS number of 2437-29-8, and Azure A dye having a CAS number of 531-53-3. According to some implementations, magnetic toner particles may be used as the buffing aid particles. These particles have the feature that excess particles can be easily removed from the layer 1403 with a magnet.

In some embodiments, the buffing aid particles have at least some affinity for the exfoliating particles. In these embodiments, the buffing aid particles, in addition to assisting in the distribution and uniformity of the coating of exfoliating particles, are themselves incorporated into the coating on the surface 1401b. Examples of such buffing aids include copper phthalocyanine having a CAS number of 147-14-8, Permanent red pigment from Magruder Color Company Inc., Elizabeth, N.J., Rose Bengel Stain having a CAS number of 632-69-9, Furnace Black carbon particles having a CAS number of 1333-86-4, Azure B dye having a CAS number of 531-55-5, Methyl orange dye having a CAS number of 547-58-0, Eosin Y dye having a CAS number of 17372-87-1, New Fuchin dye having a CAS number of 569-61-9, and ceramic particles such as Zeeospheres particles from Zeeospheres Chemicals, LLC (Lockport, La.).

Mixtures of the materials listed above can be used for layer 1403 to provide desired characteristics. By varying the proportion of the constituents in the mixture, various surface properties can be obtained. For example, with a mixture of materials, such as graphite and polyvinylidene difluoride, surface resistance of the auxiliary layer 1403 can be varied from about $10^3$ Ω/square to about $10^{11}$ Ω/square.

Suitable buffable particle containing materials have a Mohs' hardness of between 0.4 and 3 and a largest particle dimension of less than about 100 microns. In some embodiments, a "non-buffable" material (i.e., a particle-containing material outside of the "buffable" definition above) may be combined with a "buffable" material. The buffing process is then carried out as described above, producing a coating of the mixture. For example, in some embodiments, fine particles of a non-buffable pigment can be mixed with an electrically conductive material and buffed to obtain a colored, electrically conductive auxiliary layer. Colored layers may be useful to produce shutters that have an aesthetic appeal for dwelling applications.

The materials and material mixtures described above have been found to adhere very well to the surface 1401a of the non-conductive layer 1401 and to the sides 1411 of the hole 1410. In some embodiments, the adherence may be enhanced by aging. Generally, adherence of the coating to the surface 1401a substantially improves after a few days of aging, depending on the combination of the material used to coat the surface 1401b, and sides 1411. For example, the combination of graphite coating on a polyester substrate provides excellent adhesion after only about one day, with no heating required.

In some processes, adherence of the coating to the surface 1401a is assisted by heating after the buffing operation to a temperature such that the adhesion of the auxiliary layer 1403 to the surface 1401b is enhanced. The heating is below the temperature at which the sheet 1400 is substantially distorted. Typically, the heating temperature is between about 10 degrees C. below the softening temperature of the materials of the sheet 1400 to the softening temperature of the materials of the sheet 1400.

The finished auxiliary layer prepared by the process outlined above can exhibit a uniform appearance, and surprisingly the materials applied with the low energy process as described herein form an auxiliary layer 1403 which is highly adherent to the surface 1401b. The adherence of the auxiliary layer 1403 to the surface 1401b is such that, after the heat treatment or aging, a piece of SCOTCH® brand premium grade transparent cellotape 610 applied and pressed according to ASTM D-3359 to the surface 1401b of the layer 1401 with (4.5 lb roller pressure) will not remove the material of the auxiliary layer 1403 as evaluated by unaided eye visual inspection.

In some implementations of the buffing process, the buffing pad is moved in the plane of the sheet 1400 parallel to the surface 1401b. The orbital motion of the pad is carried out with its rotational axis perpendicular to the surface 1401b. Thus, the pad moves in a plurality of directions during the buffing application. The buffing motion can be a simple orbital motion or a random orbital motion. The typical orbital motion used is in the range of 1,000-10,000 orbits per minute. Very thin coatings of substantially dry particles may be obtained by buffing the particles on a nonporous polymer layer at a pressure of less than about 30 g/cm$^2$. Various types of applicator pads for use in the buffing operation may be used for applying the material to the surface 1401a. For example, the applicator pad may be a woven or non-woven fabric or cellulosic material. Alternatively, the pad may be a closed cell or open cell foam material. In yet another alternative, the pad may be a brush or an array of bristles. Preferably, the bristles of such a brush have a length of about 0.2-1 cm, and a diameter of about 30-100 microns. Bristles are preferably made from nylon or polyurethane. Preferred buffing applicators include foam pads, lamb's wool pads, and the like. The buffing operation is carried out at a temperature below the softening temperature of the non-conducting layer 1401.

The thickness of the auxiliary layer 1403 can be controlled by varying the time of buffing. Generally, the thickness of the auxiliary layer 1403 increases linearly with time after a certain rapid initial increase. The longer the buffing operation, the thicker the auxiliary layer 1403. Also, the thickness of the auxiliary layer 1403 can be controlled by controlling the amount of material on the pads used for buffing. Additionally, the thickness of the auxiliary layer 1403 can be controlled by controlling the temperature of the layer 1401 during buffing. The thickness of the auxiliary layer can be about equal to the thickness of the conductive layer.

Optionally, after the via 1350 is formed and after the buffing operation, the sheet 1400 having the auxiliary layer 1403 and electrically conductive via 1350 (as shown in FIG. 14C) is heated to a temperature up to the softening temperature of the non-conductive layer 1401 to assist in adhesion.

In some embodiments, the sheet resistance of the finished auxiliary layer 1403 may be in a range of about 10 Ω/square to about 10$^6$ Ω/square, or between about 1 kΩ/square to about 100 kΩ/square. In some embodiments, the sheet resistance of the auxiliary layer 1403 is about 3 kΩ/square. After formation of the via 1350, the resistance between the conductive layer 1402 and the auxiliary layer 1403 may be in a range of about 5 kΩ to about 500 kΩ, or about 50 kΩ to about 100 kΩ, or about 75 kΩ for example. Surprisingly, the resistance between the conductive layer 1402 and the auxiliary layer 1403 does not change substantially after more than 1 million cycles of flexing the via 1350.

Figure 15A:
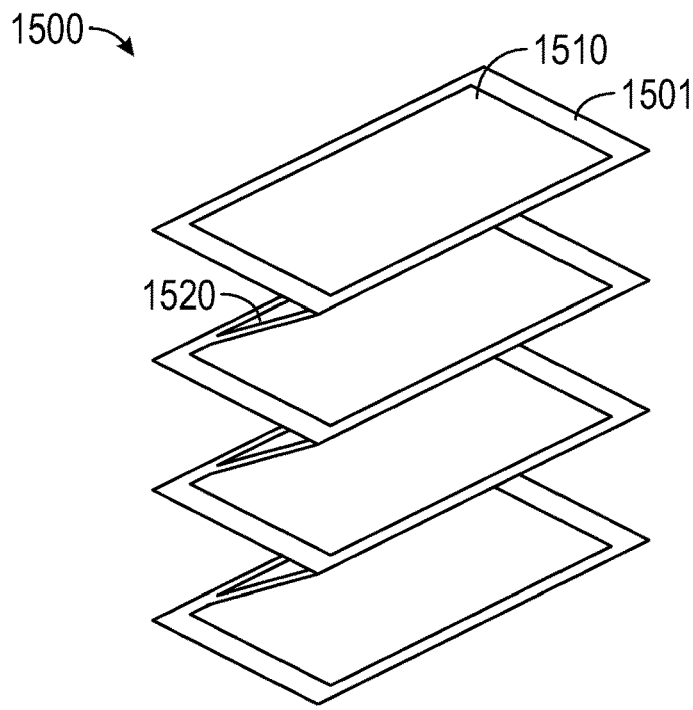
FIGS. 15A and 15B illustrate shutter elements that include folded films according to some embodiments.
Figure 15B:
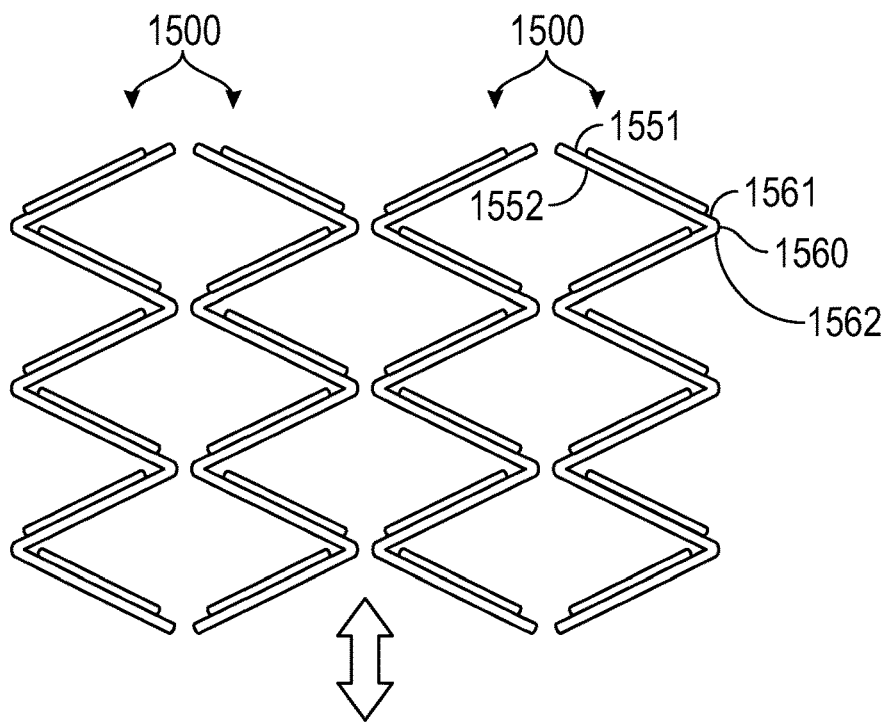

FIGS. 15A and 15B illustrate another embodiment of a shutter in accordance with some embodiment. FIG. 15A shows a shutter element 1500 comprising a fan-folded non-conductive film 1501 having a front surface 1551, a back surface 1552, and multiple folds 1560. Each fold 1560 includes a first fold portion 1561 on one side of the fold 1560 and a second fold portion 1562 on an opposite side of the fold 1560. Pairs of electrodes are patterned on the non-conductive film 1501. Each electrode pair 1510, 1520 includes a first electrode 1510 patterned on the front surface 1551 of the first fold portion 1561 of each fold 1560 of the film 1501. A second electrode 1520 of the electrode pair 1510, 1520 is patterned on the back surface 1552 of the second fold portion 1562 of each fold 1560 of the film 1501. The folds 1560 are arranged to reversibly transition between an open state and a closed state in response to an electric potential above a threshold magnitude applied between the first 1510 and second electrodes 1520. When the folds 1560 transition to the open state, the shutter element 1500 expands and when folds 1560 transition to the closed state, the shutter element 1500 compresses. The film 1501 may have built in mechanical stress that maintains the folds 1560 in the open state in the absence of an electrical potential across the electrodes 1510, 1520.

LIST OF ILLUSTRATIVE EMBODIMENTS

The following embodiments are listed to illustrate particular features of the disclosure and are not intended to be limiting.

Embodiment 1

A device comprising a connected array of cells comprising a stack of flexible sheets, each pair of adjacent sheets in the stack including a first sheet and a second sheet bonded together at multiple bond locations, each sheet having an electrically conductive layer disposed on an electrically non-conductive layer, the conductive layer comprising an electrically conductive non-metal material, each pair of adjacent sheets in the stack arranged so that the non-conductive layer of each first sheet is between the conductive layers of the first and second sheets, the cells of the array configured to reversibly transition between an open state and a closed state in response to an electric potential having a magnitude greater than a threshold value applied between the conductive layers of the first and second sheets.

Embodiment 2

The device of embodiment 1, wherein each first sheet has a built-in mechanical stress that mechanically biases each first sheet away from each second sheet between adjacent bond locations of the first and second sheets, the mechanical stress of the first sheet maintaining the cells in the open state in the absence of the electric potential.

Embodiment 3

The device of any of embodiments 1 through 2, wherein the non-metal material comprises a carbon-containing material.

Embodiment 4

The device of embodiment 3, wherein the carbon-containing material comprises graphene like carbon (GLC).

Embodiment 5

The device of any of embodiments 1 through 4, wherein the non-metal material comprises nano-scale particles of the non-metal material.

Embodiment 6

The device of any of embodiments 1 through 5, wherein the electric potential is between about 1 V to about 300 V.

Embodiment 7

The device of any of embodiments 1 through 6, wherein each sheet comprises an adhesive layer between the non-conductive and conductive layers.

Embodiment 8

The device of any of embodiments 1 through 7, further comprising a release coating disposed on one or both of the non-conductive layer and the conductive layer.

Embodiment 9

An assembly comprising:
a connected array of cells comprising a stack of flexible sheets, each pair of adjacent sheets in the stack including a first sheet and a second sheet bonded together at multiple bond locations, each sheet having an electrically conductive layer disposed on an electrically non-conductive layer, the conductive layer comprising an electrically conductive non-metal material, each pair of adjacent sheets in the stack arranged so that the non-conductive layer of each first sheet is between the conductive layers of the first and second sheets, the array of cells configured to compress in response to an electric potential having a magnitude greater than a threshold value applied between the conductive layers of the first and second sheets; and
a frame attached to the array of cells, the frame comprising one or more frame members extending along one or more edges of the array of cells.

Embodiment 10

The assembly of embodiment 9, further comprising a power supply having a first terminal electrically coupled to the conductive layers of the first sheets and a second terminal electrically to the conductive layers of the second sheets, the power supply configured to provide the electric potential between the first and second terminals.

Embodiment 11

The assembly of any of embodiments 9 through 10, wherein the power supply is configured to provide a variable electric potential between the first and second terminals and an amount of compression of the array is a function of the variable electric potential.

Embodiment 12

The assembly of any of embodiments 9 through 11, further comprising:
first connecting sheets arranged to electrically connect the conductive layers of each of the first sheets; and
second connecting sheets arranged to electrically connect the conductive layers of each of the second sheets.

Embodiment 13

The assembly of embodiment 12, wherein the conductive layer of each first sheet is electrically connected to a conductive layer of at least one first connecting sheet by an electrically conductive via that extends through the non-conductive layer of the first sheet.

Embodiment 14

The assembly of embodiment 13, wherein the conductive layer of each second sheet is electrically connected to a conductive layer of at least one second connecting sheet by an electrically conductive via that extends through the non-conductive layer of the first sheet.

Embodiment 15

The assembly of embodiment 14, wherein:
the conductive layer is disposed on a first major surface of the non-conductive layer of each sheet;
an auxiliary electrically conductive layer is disposed on an opposing, second surface of the non-conductive layer of each sheet; and
the electrically conductive via extends through non-conductive layer and electrically connects the conductive layer and the auxiliary conductive layer.

Embodiment 16

The assembly of embodiment 15, wherein surface resistance of the auxiliary layer is in a range from about 1 kΩ/square to about 100 kΩ/square.

Embodiment 17

The assembly of embodiment 15, wherein the auxiliary layer extends partially but not completely across the second surface of the non-conductive layer.

Embodiment 18

The assembly of embodiment 15, wherein resistance between the conductive layer and the auxiliary layer through the via is a range of about 50 kΩ to about 100 kΩ.

Embodiment 19

A method, comprising:
applying an electric potential above a threshold magnitude between first and second electrically conductive layers of pairs adjacent sheets arranged in a stack of sheets, each pair of sheets including a first sheet and a second sheet, each first sheet comprising a first electrically conductive layer comprising a non-metal electrically conductive material disposed on a first electrically non-conductive layer, each second sheet comprising a second electrically conductive layer comprising a non-metal electrically conductive material disposed on a second electrically non-conductive layer, each first and second sheet bonded together at multiple bond locations in a connected array of cells; and
in response to the electric potential applied between the conductive layers of the first and second sheets, the array reversibly transitioning from an expanded state to a compressed state.

Embodiment 20

The method of embodiment 19, further comprising:
applying an electric potential having a magnitude that is decreased in comparison with the threshold magnitude between the first and second electrically conductive layers; and
in response to applying the electric potential having the decreased magnitude, the array reversibly transitioning from the compressed state to the expanded state.

Embodiment 21

The method of any of embodiments 19 through 20, further comprising:
applying an electric potential having an intermediate magnitude between the first and second electrically conductive layers, the intermediate magnitude between the threshold magnitude and the decreased magnitude; and
in response to applying the electric potential having the intermediate magnitude, the cells reversibly transitioning to an intermediate state between a fully expanded and a fully compressed state.

Embodiment 22

A method comprising:
forming sheets, each sheet formed by disposing an electrically conductive layer on an electrically non-conductive layer, the conductive layer comprising an electrically conductive non-metal material;
arranging the sheets in a stack of sheets, the stack of sheets having multiple pairs of adjacent first and second sheets, a non-conductive layer of a first sheet of each pair of adjacent first and second sheets disposed between an electrically conductive layer of the first sheet and an electrically conductive layer of a second sheet of the pair of adjacent first and second sheets; and
bonding the pairs of adjacent first and second sheets at multiple locations, the bonding forming a connected array of cells within the stack of sheets.

Embodiment 23

The method of embodiment 22, wherein disposing the electrically conductive layer on the electrically non-conductive layer comprises buff coating the electrically conductive non-metal material on a surface of the electrically non-conductive layer.

Embodiment 24

The method of any of embodiments 22 through 23, further comprising:
electrically connecting electrically conductive layers of the first sheets; and
electrically connecting electrically conductive layers of the second sheets.

Embodiment 25

The method of embodiment 24, wherein:
electrically connecting the electrically conductive layers of the first sheets comprises electrically connecting first connecting sheets between the electrically conductive layers of the first sheets, each first connecting sheet electrically connected to the electrically conductive layer at least one first sheet by forming an electrically conductive via that extends through the non-conductive layer of the at least one first sheet; and
electrically connecting the electrically conductive layers of the second sheets comprises electrically connecting second connecting sheets between the electrically conductive layers of the second sheets, each second connecting sheet electrically connected to the electrically conductive layer of the at least one second sheet by forming an electrically conductive via that extends through the non-conductive layer of the at least one second sheet.

Embodiment 26

The method of embodiment 25, wherein forming the via that extends through the non-conductive layer of at least one first sheet comprises:
forming a hole in the first sheet that extends through the conductive and non-conductive layers of the first sheet; and
buff coating a particle-containing electrically conductive material on a surface of the non-conductive layer opposite the electrically conductive layer, the buff coating forcing particles of the particle-containing electrically conductive material into the hole and coating the sides of the hole with the particle containing electrically conductive material.

Embodiment 27

A device comprising:
a fan-folded non-conductive film having a front surface, a back surface, and multiple folds, each fold including a first portion on one side of the fold and a second portion on an opposite side of the fold;
pairs of electrodes patterned on the non-conductive film, each electrode pair comprising:
a first electrode patterned on the front surface of the first fold portion of each fold of the film; and
a second electrode patterned on the back surface of the second portion of each fold of the film, wherein the folds are arranged to reversibly transition between an open state and a closed state in response to an electric potential above a threshold magnitude applied between the first and second electrodes.

Various modifications and alterations of the embodiments will be apparent to those skilled in the art and it should be understood that this scope of this disclosure is not limited to the illustrative embodiments set forth herein.

The invention claimed is:

1. A device comprising a connected array of cells comprising a stack of flexible sheets, each pair of adjacent sheets in the stack including a first sheet and a second sheet bonded together at multiple bond locations, each sheet having an electrically conductive layer disposed on an electrically non-conductive layer, the conductive layer comprising an electrically conductive non-metal material, each pair of adjacent sheets in the stack arranged so that the non-conductive layer of each first sheet is between the conductive layers of the first and second sheets, the cells of the array configured to reversibly transition between an open state and a closed state in response to an electric potential having a magnitude greater than a threshold value applied between the conductive layers of the first and second sheets;
a frame attached to the connected array of cells, the frame comprising one or more frame members extending along one or more edges of the connected array of cells;
a power supply having a first terminal electrically coupled to the conductive layers of the first sheets and a second terminal electrically to the conductive layers of the second sheets, the power supply configured to provide the electric potential between the first and second terminals;

and wherein either (a) the power supply is configured to provide a variable electric potential between the first and second terminals and an amount of compression of the array is a function of the variable electric potential, or (b) the device further comprises first connecting sheets arranged to electrically connect the conductive layers of each of the first sheets and second connecting sheets arranged to electrically connect the conductive layers of each of the second sheets and wherein the conductive layer of each first sheet is electrically connected to a conductive layer of at least one first connecting sheet by an electrically conductive via that extends through the non-conductive layer of the first sheet, or (c) the power supply is configured to provide a variable electric potential between the first and second terminals and an amount of compression of the array is a function of the variable electric potential, and the device further comprises first connecting sheets arranged to electrically connect the conductive layers of each of the first sheets and second connecting sheets arranged to electrically connect the conductive layers of each of the second sheets and wherein the conductive layer of each first sheet is electrically connected to a conductive layer of at least one first connecting sheet by an electrically conductive via that extends through the non-conductive layer of the first sheet the conductive layer of each first sheet is electrically connected to a conductive layer of at least one first connecting sheet by an electrically conductive via that extends through the non-conductive layer of the first sheet.

2. The device of claim 1, wherein each first sheet has a built-in mechanical stress that mechanically biases each first sheet away from each second sheet between adjacent bond locations of the first and second sheets, the mechanical stress of the first sheet maintaining the cells in the open state in the absence of the electric potential.

3. The device of claim 1, wherein the non-metal material comprises a carbon-containing material.

4. The device of claim 3, wherein the carbon-containing material comprises graphene like carbon (GLC).

5. The device of claim 1, wherein the non-metal material comprises nano-scale particles of the non-metal material.

6. The device of claim 1, wherein the electric potential is between about 1 V to about 300 V.

7. The device of claim 1, wherein each sheet comprises an adhesive layer between the non-conductive and conductive layers.

8. The device of claim 1, wherein the power supply is configured to provide a variable electric potential between the first and second terminals and an amount of compression of the array is a function of the variable electric potential.

9. The device of claim 1, further comprising:
first connecting sheets arranged to electrically connect the conductive layers of each of the first sheets; and
second connecting sheets arranged to electrically connect the conductive layers of each of the second sheets and wherein the conductive layer of each first sheet is electrically connected to a conductive layer of at least one first connecting sheet by an electrically conductive via that extends through the non-conductive layer of the first sheet.

10. A method, comprising:
applying an electric potential above a threshold magnitude between first and second electrically conductive layers of pairs of adjacent sheets in a device of claim 1; and
in response to the electric potential applied between the conductive layers of the first and second sheets, the array reversibly transitioning from an expanded state to a compressed state.

11. The method of claim 10, further comprising:
applying an electric potential having a magnitude that is decreased in comparison with the threshold magnitude between the first and second electrically conductive layers; and
in response to applying the electric potential having the decreased magnitude, the array reversibly transitioning from the compressed state to the expanded state.

12. The method of claim 10, further comprising:
applying an electric potential having an intermediate magnitude between the first and second electrically conductive layers, the intermediate magnitude between the threshold magnitude and the decreased magnitude; and
in response to applying the electric potential having the intermediate magnitude, the cells reversibly transitioning to an intermediate state between a fully expanded and a fully compressed state.

13. A method of making a device of claim 1, comprising:
forming sheets, each sheet formed by disposing an electrically conductive layer on an electrically non-conductive layer, the conductive layer comprising an electrically conductive non-metal material;
arranging the sheets in a stack of sheets, the stack of sheets having multiple pairs of adjacent first and second sheets, a non-conductive layer of a first sheet of each pair of adjacent first and second sheets disposed between an electrically conductive layer of the first sheet and an electrically conductive layer of a second sheet of the pair of adjacent first and second sheets; and
bonding the pairs of adjacent first and second sheets at multiple locations, the bonding forming a connected array of cells within the stack of sheets.

14. The method of claim 13, wherein disposing the electrically conductive layer on the electrically non-conductive layer comprises buff coating the electrically conductive non-metal material on a surface of the electrically non-conductive layer.

15. The method of claim 13, further comprising:
electrically connecting electrically conductive layers of the first sheets; and
electrically connecting electrically conductive layers of the second sheets.

16. The method of claim 15, wherein:
electrically connecting the electrically conductive layers of the first sheets comprises electrically connecting first connecting sheets between the electrically conductive layers of the first sheets, each first connecting sheet electrically connected to the electrically conductive layer of at least one first sheet by forming an electrically conductive via that extends through the non-conductive layer of the at least one first sheet; and
electrically connecting the electrically conductive layers of the second sheets comprises electrically connecting second connecting sheets between the electrically conductive layers of the second sheets, each second connecting sheet electrically connected to the electrically conductive layer of at least one second sheet by forming an electrically conductive via that extends through the non-conductive layer of the at least one second sheet.

17. The method of claim 16, wherein forming the via that extends through the non-conductive layer of the at least one first sheet comprises:
 forming a hole in the first sheet that extends through the conductive and non-conductive layers of the first sheet; and
 buff coating a particle-containing electrically conductive material on a surface of the non-conductive layer opposite the electrically conductive layer, the buff coating forcing particles of the particle-containing electrically conductive material into the hole and coating the sides of the hole with the particle containing electrically conductive material.

\* \* \* \* \*